US012147216B2

(12) United States Patent
Kaneko et al.

(10) Patent No.: US 12,147,216 B2
(45) Date of Patent: Nov. 19, 2024

(54) MACHINING PROGRAM CONVERSION DEVICE, NUMERICAL CONTROL DEVICE, AND MACHINING PROGRAM CONVERSION METHOD

(71) Applicant: Mitsubishi Electric Corporation, Tokyo (JP)

(72) Inventors: Hiroki Kaneko, Tokyo (JP); Kenji Iriguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 441 days.

(21) Appl. No.: 17/762,373

(22) PCT Filed: Nov. 13, 2019

(86) PCT No.: PCT/JP2019/044566
§ 371 (c)(1),
(2) Date: Mar. 22, 2022

(87) PCT Pub. No.: WO2021/095170
PCT Pub. Date: May 20, 2021

(65) Prior Publication Data
US 2022/0382253 A1    Dec. 1, 2022

(51) Int. Cl.
*G05B 19/4155* (2006.01)
*G05B 19/4093* (2006.01)
(52) U.S. Cl.
CPC ... *G05B 19/4155* (2013.01); *G05B 19/40937* (2013.01)
(58) Field of Classification Search
None
See application file for complete search history.

(56) References Cited

U.S. PATENT DOCUMENTS 10,152,046 B2 *  12/2018  Hsu ................. G05B 19/40937

FOREIGN PATENT DOCUMENTS

| JP | 2010-61297 A | 3/2010 |
| WO | 2020/021793 A1 | 1/2020 |

OTHER PUBLICATIONS

International Search Report and Written Opinion mailed on Jan. 21, 2020, received for PCT Application PCT/JP2019/044566, Filed on Nov. 13, 2019, 11 pages including English Translation.

* cited by examiner

*Primary Examiner* — Ryan A Jarrett
(74) *Attorney, Agent, or Firm* — XSENSUS LLP

(57) ABSTRACT

A machining program conversion device includes: a numerical control simulation unit that generates a numerical control processing result by simulating numerical control processing that is controlled by the machining program; a modification part detection unit that detects a modification part based on a modification condition and the numerical control processing result, the modification condition for determining whether there is a modification part; a modification section determination unit that designates consecutive blocks including the modification part as a modification section; a cutting point calculation unit that identifies, based on the machining program, the machining target shape, and the tool information, a cutting point of the tool with respect to the machining target shape; and a machining program modification unit that modifies, based on the machining program, the modification section, and the cutting point, the movement command related to the modification section such that the cutting point does not change.

9 Claims, 23 Drawing Sheets

MACHINING PROGRAM CONVERSION DEVICE, NUMERICAL CONTROL DEVICE, AND MACHINING PROGRAM CONVERSION METHOD

CROSS-REFERENCE TO RELATED APPLICATION

The present application is based on PCT filing PCT/JP2019/044566, filed Nov. 13, 2019, the entire contents of which is incorporated herein by reference.

FIELD

The present invention relates to a machining program conversion device that converts a machining program for controlling a machine tool for workpiece cutting, a numerical control device, and a machining program conversion method.

BACKGROUND

Machining with a numerical control device that controls a machine tool for workpiece cutting requires a numerical control machining program describing movement commands for moving the tool or workpiece on a preset path. Hereinafter, numerical control machining programs are simply referred to as machining programs. Machining programs are created by, for example, commercially available computer-aided design (CAD)/computer-aided manufacturing (CAM) devices. Machining programs are described in G-code, macro sentences, and the like. G-code is a command code described in a machining program for positioning, linear interpolation, circular interpolation, and plane designation through numerical control, for example.

For machining of shapes having a free-form surface or shapes that are difficult to machine with three-axis control machining, five-axis control machine tools are conventionally used, which include a mechanism for translational movement and rotational movement of the workpiece or tool. A CAD/CAM device creates tool path data. The tool path data include a path obtained through approximation by generating command points for the tool end from a sequence of points on a path along which the tool is virtually moved in contact with the workpiece or machining curved surface, and then connecting the command positions with a straight line. The tool path data also include rotation axis angle commands for determining a relative posture between the tool and the workpiece at each command position.

The tool path data output from the CAD/CAM device are described in a machining program as G-code movement commands interpretable by numerical control devices. The machining program is input to the numerical control device provided in the numerical control machine tool. The numerical control machine tool performs cutting according to this machining program. By reading and interpreting the machining program, the numerical control device interpolates the tool path in each interpolation cycle using the movement commands to create interpolation data. The numerical control device controls each axis of the numerical control machine tool with the created interpolation data. The numerical control machine tool performs machining by moving the tool to desired positions under the control of the numerical control device.

In the case of machining with the machining program generated by the above-described procedure, the speed of the rotation axis that determines the posture of the tool may be abruptly changed by a movement command in the machining program, causing a large acceleration that may deteriorate machining quality. In such a case, the numerical control device corrects rotation axis commands in the movement command to prevent the large acceleration from occurring.

Patent Literature 1 discloses a method of changing rotation axis commands with respect to a ball center trajectory of a ball end mill to create corrected trajectory data, so that a trajectory can be determined that minimizes the largest one of the maximum accelerations of a plurality of drive axes.

CITATION LIST

Patent Literature

Patent Literature 1: Japanese Patent Application Laid-open No. 2010-61297

SUMMARY

Technical Problem

However, the conventional technique described in Patent Literature 1 can only control ball center trajectories of a ball end mill: applying the technique to any other tool may result in excessive cutting or insufficient cutting of the workpiece. For this reason, the technique cannot be applied to machining programs different from machining programs created as ball center trajectories of a ball end mill, which is problematic.

The present invention has been made in view of the above problems, and an object thereof is to obtain a machining program conversion device that is applicable to not only machining programs related to ball center trajectories of a ball end mill but also other machining programs to prevent deterioration of machining quality.

Solution to Problem

In order to solve the above problem and achieve the object, a machining program conversion device according to the present invention includes: a machining program storage unit to store a machining program describing a movement command that is a command for moving a tool according to a predetermined path; a machining target shape storage unit to store a machining target shape that is a finished shape of a workpiece to be machined through movement of the tool; a tool information storage unit to store tool information about a shape of the tool; a numerical control simulation unit to generate a numerical control processing result by simulating, based on the machining program, numerical control processing of a numerical control machine tool that is controlled by the machining program; a modification part detection unit to detect a modification part in the machining program based on a modification condition and the numerical control processing result, the modification condition being a condition for determining whether there is a modification part in the machining program; a modification section determination unit to designate a plurality of consecutive blocks including the modification part as a modification section; a cutting point calculation unit to identify, based on the machining program, the machining target shape, and the tool information, a cutting point of the tool with respect to the machining target shape in the movement command in the machining program; and a machining program modification unit to modify, based on the machining program, the modification section, and the cutting point, the movement command related to the modification section such that the cutting point does not change.

Advantageous Effects of Invention

The present invention can achieve the effect of obtaining a machining program conversion device that is applicable to not only tool path data related to ball center trajectories of a ball end mill but also other tool path data to prevent deterioration of machining quality.

DESCRIPTION OF EMBODIMENTS

Hereinafter, a machining program conversion device, a numerical control device, and a machining program conversion method according to embodiments of the present invention will be described in detail with reference to the drawings. The present invention is not limited to the embodiments.

First Embodiment

Figure 1:
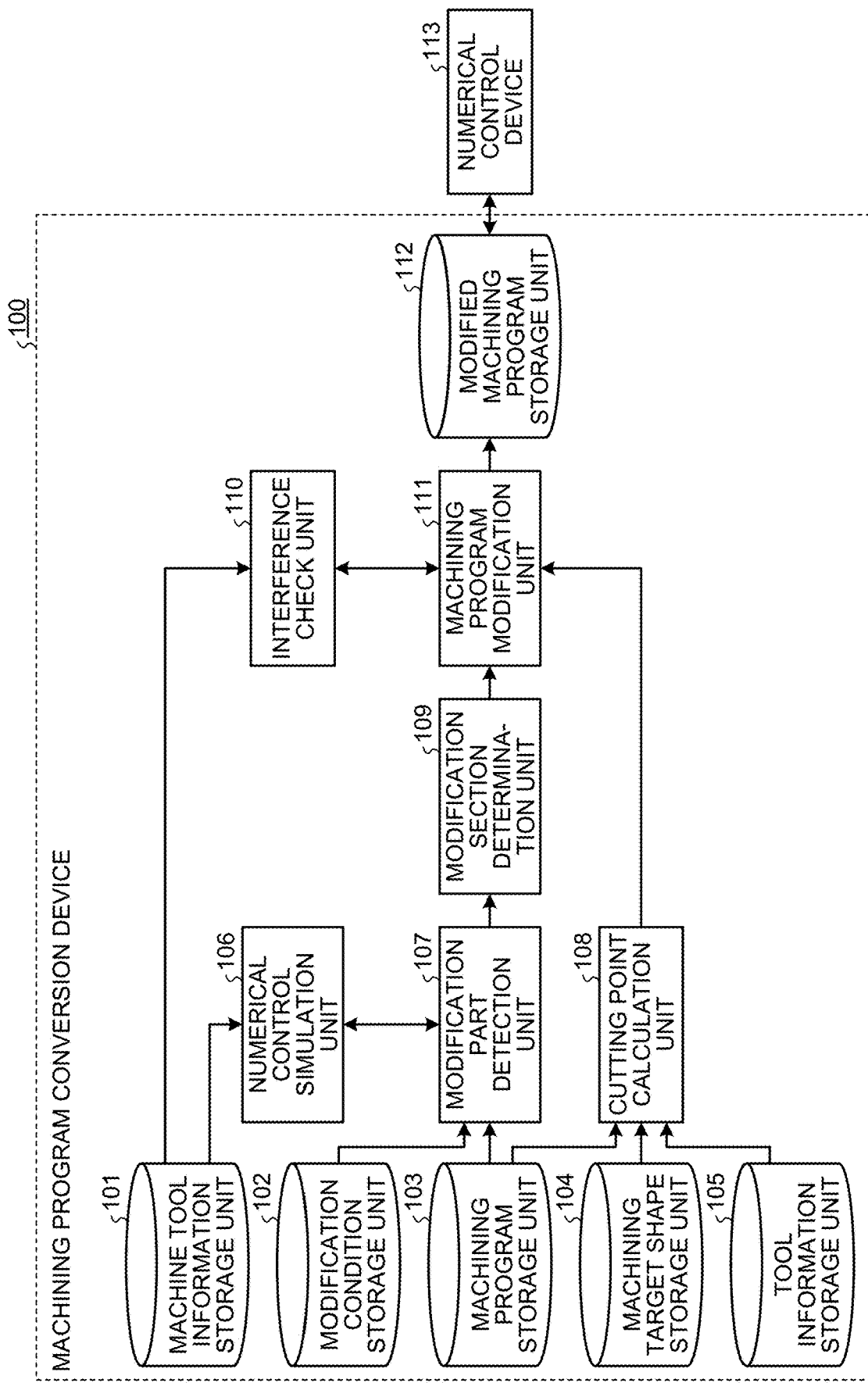
FIG. 1 is a diagram illustrating a configuration of a machining program conversion device according to a first embodiment of the present invention.

FIG. 1 is a diagram illustrating a configuration of a machining program conversion device 100 according to the first embodiment of the present invention. The machining program conversion device 100 includes a machine tool information storage unit 101, a modification condition storage unit 102, a machining program storage unit 103, a machining target shape storage unit 104, a tool information storage unit 105, a numerical control simulation unit 106, a modification part detection unit 107, a cutting point calculation unit 108, a modification section determination unit 109, an interference check unit 110, a machining program modification unit 111, and a modified machining program storage unit 112.

The machine tool information storage unit 101 receives an external input of numerical control machine tool information, i.e. information about a numerical control machine tool that machines a workpiece. The external input is exemplified by an operator's input operation on a keyboard (not illustrated) or the like, or an input through data output from a numerical control device 113. Note that the external input is not illustrated here. The numerical control machine tool information includes, for example, information on the configuration of the components and drive axes of the numerical control machine tool, information about the coordinate system and tool attachment length, information about parameters of the numerical control device, and the like.

The modification condition storage unit 102 stores a modification condition, i.e. a condition for determining whether there is a modification part in a machining program. The machining program includes commands for relative movement between the tool and the workpiece. The machining program storage unit 103 stores the machining program. The machining target shape storage unit 104 stores the finished shape, that is, the machining target shape, of the workpiece. The tool information storage unit 105 stores information about the shape of the tool. The numerical control simulation unit 106 simulates numerical control processing of the numerical control machine tool based on the machining program, and outputs the numerical control processing results.

The modification part detection unit 107 detects a modification part in the machining program based on the modification condition and the numerical control processing results. The cutting point calculation unit 108 identifies the cutting points of the tool with respect to the machining target shape in each movement command in the machining program based on the machining program, the machining target shape, and the tool information. The modification section determination unit 109 designates, as a modification section, a plurality of consecutive blocks including the modification part in the machining program. The interference check unit 110 detects an interference between the tool, the workpiece, and the components of the numerical control machine tool. The machining program modification unit 111 modifies the movement command related to the modification section such that the cutting points do not change based on the machining program, the modification section, and the cutting points. The modified machining program storage unit 112 stores the modified machining program.

The numerical control simulation unit 106, the modification part detection unit 107, the cutting point calculation unit 108, the modification section determination unit 109, the interference check unit 110, and the machining program modification unit 111 according to the first embodiment of the present invention are implemented by processing circuitry, i.e. electronic circuitry that performs each process.

Figure 2:
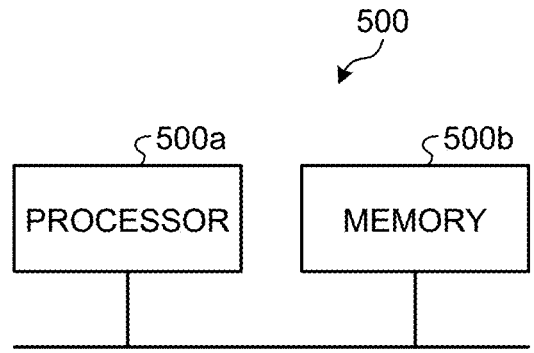
FIG. 2 is a diagram illustrating an exemplary configuration of a control circuit according to the first embodiment of the present invention.

The processing circuitry according to the embodiment of the present invention may be dedicated hardware or a control circuit including a memory and a central processing unit (CPU) that executes programs stored in the memory. The memory as used herein is, for example, a nonvolatile or volatile semiconductor memory such as a random access memory (RAM), a read only memory (ROM), or a flash memory. FIG. 2 is a diagram illustrating an exemplary configuration of a control circuit 500 according to the first embodiment of the present invention. In a case where the processing circuitry is dedicated hardware, the processing circuitry is, for example, an application specific integrated circuit (ASIC), a field programmable gate array (FPGA), or a combination thereof.

As illustrated in FIG. 2, the control circuit 500 includes a processor 500a that is a CPU and a memory 500b. In the case where the numerical control simulation unit 106, the modification part detection unit 107, the cutting point calculation unit 108, the modification section determination unit 109, the interference check unit 110, and the machining program modification unit 111 are implemented by the control circuit 500 illustrated in FIG. 2, the processor 500a reads and executes programs corresponding to the respective processes stored in the memory 500b for implementation. The memory 500b is also used as a temporary memory for each process performed by the processor 500a. The machine tool information storage unit 101, the modification condition storage unit 102, the machining program storage unit 103, the machining target shape storage unit 104, the tool information storage unit 105, and the modified machining program storage unit 112 are implemented by the memory 500b.

Figure 3:
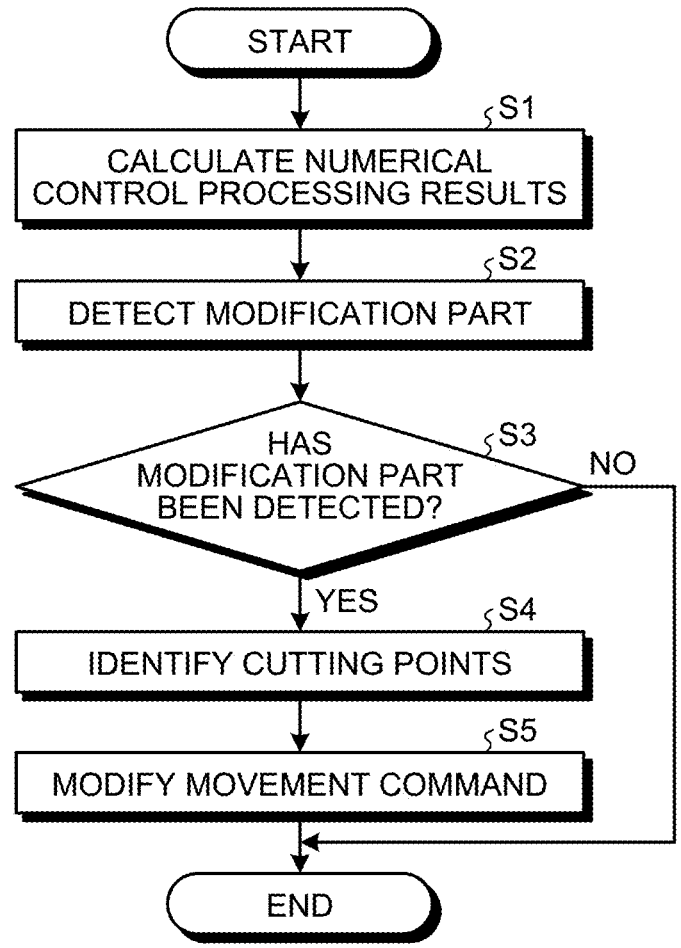
FIG. 3 is a flowchart illustrating the operation of the machining program conversion device according to the first embodiment of the present invention.

FIG. 3 is a flowchart illustrating the operation of the machining program conversion device 100 according to the first embodiment of the present invention. The machining program conversion device 100 operates according to the flowchart illustrated in FIG. 3.

The numerical control simulation unit 106 executes numerical control simulation according to a movement command described in the machining program stored in the machining program storage unit 103 and the numerical control machine tool information stored in the machine tool information storage unit 101, and calculates numerical control processing results (step S1). The modification part detection unit 107 detects a modification part, i.e. a part of the movement command to be modified, according to the calculated numerical control processing results and the modification condition stored in the modification condition storage unit 102 (step S2).

The modification part detection unit 107 determines whether a modification part has been detected (step S3). In response to the modification part detection unit 107 detecting a modification part (step S3: Yes), the cutting point calculation unit 108 identifies the cutting points of the tool with respect to the machining curved surface on the machining curved surface of the machining target shape according to the movement command in the machining program stored in the machining program storage unit 103, the machining target shape stored in the machining target shape storage unit 104, and the tool information stored in the tool information storage unit 105 (step S4). If the modification part detection unit 107 does not detect a modification part (step S3: No), the process ends. The machining program modification unit 111 modifies the movement command related to the modification section such that the cutting points do not change based on the movement command in the machining program, the determined modification section, and the calculated cutting points (step S5).

Movement commands in a machining program will be described. The machining program storage unit 103 receives an external input of a machining program describing movement commands for moving a workpiece or tool along a preset path. The external input is exemplified by an input of data converted using CAD data, or an operator's graphic input operation on a keyboard or the like.

Figure 4:
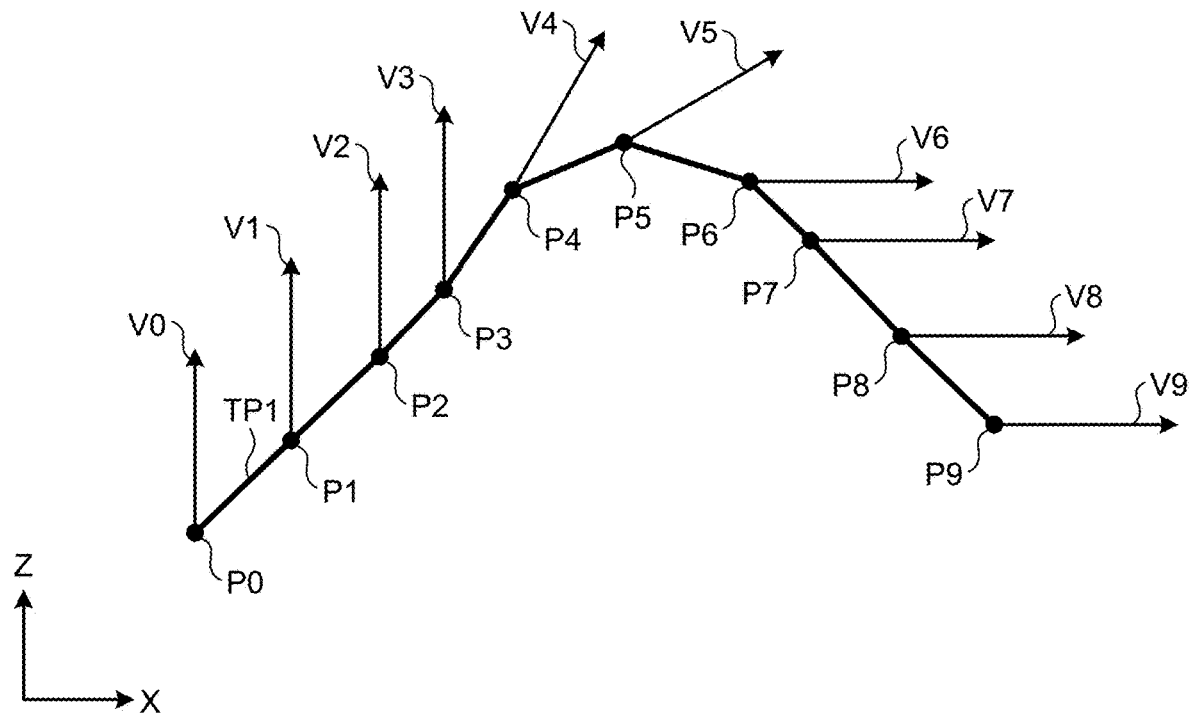
FIG. 4 is a diagram illustrating an example of tool end positions and tool axis directions according to the first embodiment of the present invention.

FIG. 4 is a diagram illustrating an example of tool end positions and tool axis directions according to the first embodiment of the present invention. In FIG. 4, the horizontal direction represents the X axis, and the vertical direction represents the Z axis. The movement command TP1 illustrated in FIG. 4 includes a plurality of position commands specifying different tool end positions P0 to P9 through which the end of the tool passes, and a plurality of rotation axis commands specifying different tool axis directions V0 to V9, i.e. directions of the rotation axis of the tool with its end at the tool end positions P0 to P9, respectively.

The machining target shape storage unit 104 receives an external input of a machining target shape, i.e. a target shape of a workpiece including a machining curved surface that is a curved surface to be machined by the tool.

Figure 5:
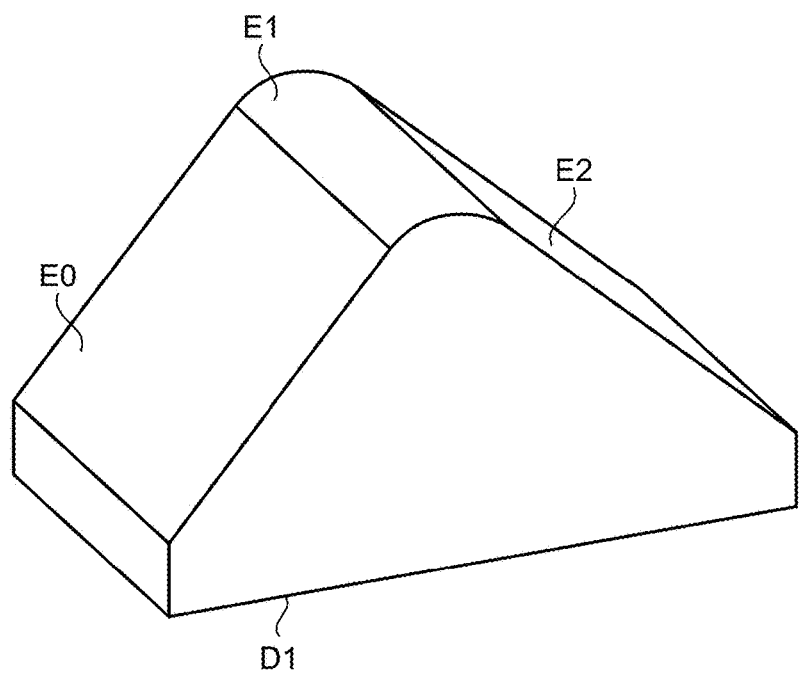
FIG. 5 is a diagram illustrating an example of a machining target shape according to the first embodiment of the present invention.
Figure 6:
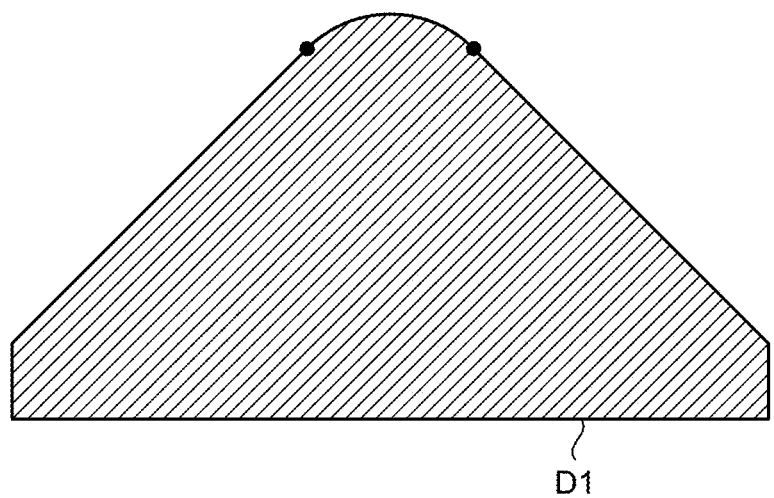
FIG. 6 is a diagram illustrating a cross-section of the machining target shape according to the first embodiment of the present invention.

FIG. 5 is a diagram illustrating an example of a machining target shape according to the first embodiment of the present invention. The machining target shape D1 illustrated in FIG. 5 includes machining curved surfaces E0 to E2. FIG. 6 is a diagram illustrating a cross-section of the machining target shape D1 according to the first embodiment of the present invention. The black points depicted in FIG. 6 are boundary points between the machining curved surfaces E0 to E2.

The tool information storage unit 105 receives an external input of tool information, i.e. information defining a tool shape for machining the workpiece. The tool information is information from which a tool shape can be generated, for example, information including tool type, tool diameter, tool length, and the like. For example, in the case of a tapered tool shape or the like, the inclination of the tool outer diameter generatrix with respect to the tool center axis may be given as tool information, or information on an asymmetric tool such as a turning tool may be used.

Figure 7:
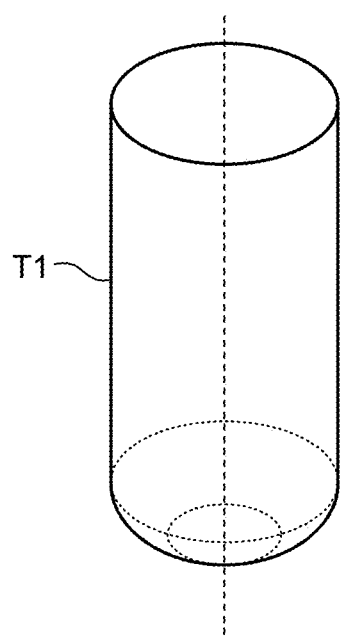
FIG. 7 is a diagram illustrating an example of a tool according to the first embodiment of the present invention.

FIG. 7 is a diagram illustrating an example of a tool according to the first embodiment of the present invention. The tool T1 illustrated in FIG. 7 is based on tool information representing a radius end mill. The broken line passing through the center of the tool T1 illustrated in FIG. 7 is the center line of the tool T1.

Figure 8:
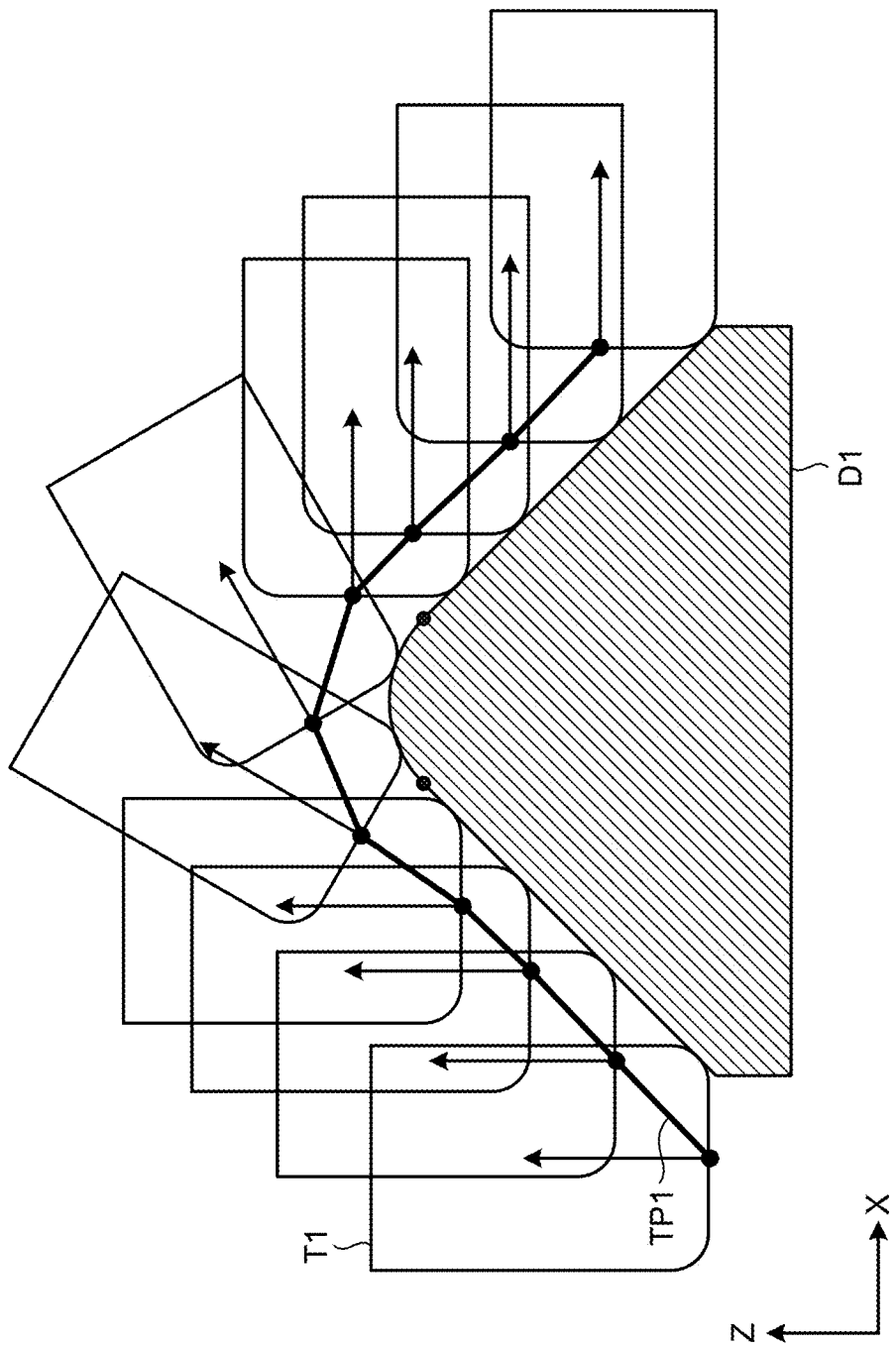
FIG. 8 is a diagram illustrating the relationship between the tool and the machining target shape, where the tool is arranged based on the movement command in the machining program, according to the first embodiment of the present invention.

FIG. 8 is a diagram illustrating the relationship between the tool and the machining target shape, where the tool is arranged based on the movement command in the machining program, according to the first embodiment of the present invention. In FIG. 8, a plurality of black circles each indicate a tool end position specified by the movement command. The thick line connecting the black circles indicates the tool end path through which the end of the tool passes during machining. The arrows extending from the black circles each indicate the tool axis direction specified by a rotation axis command. The tool T1 is arranged on the machining target shape D1 based on each tool end position and each tool axis direction.

Figure 9:
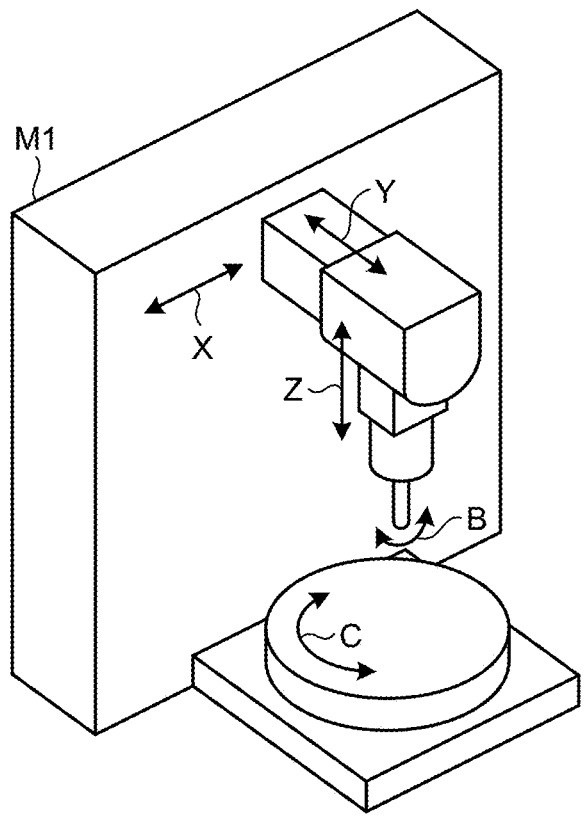
FIG. 9 is a diagram illustrating an example of a numerical control machine tool according to the first embodiment of the present invention.

FIG. 9 is a diagram illustrating an example of a numerical control machine tool according to the first embodiment of the present invention. The numerical control machine tool M1 illustrated in FIG. 9 includes three linear axes X, Y, and Z. The numerical control machine tool M1 also includes a rotation axis parallel to the Y axis for rotating the tool and a rotation axis parallel to the Z axis for rotating the table. In FIG. 9, the arrow B indicates the rotation of the tool, and the arrow C indicates the rotation of the table. In the following description, the rotation axis for rotating the tool may be referred to as the axis B and the rotation axis for rotating the table may be referred to as the axis C so as to distinguish between the rotation axis for rotating the tool and the rotation axis for rotating the table.

Figure 10:
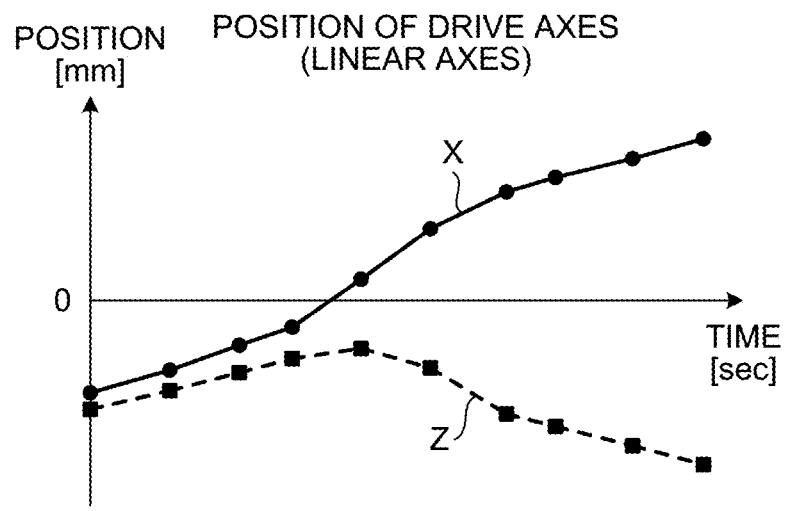
FIG. 10 is a first diagram illustrating an exemplary numerical control processing result according to the first embodiment of the present invention.
Figure 11:
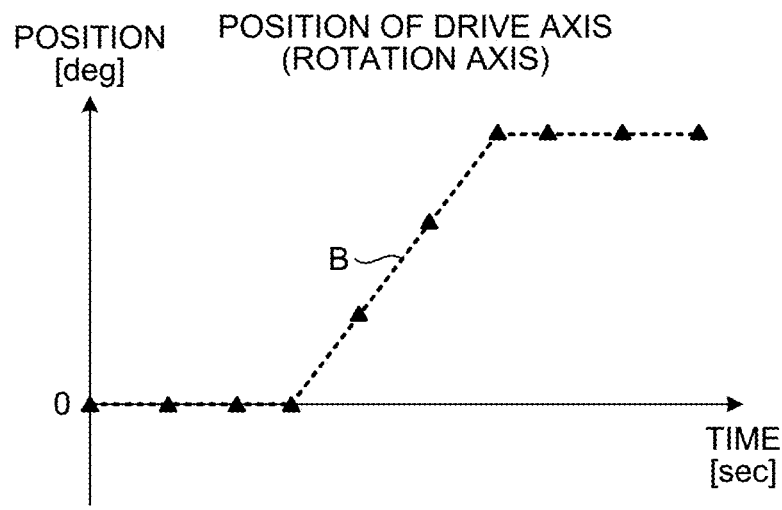
FIG. 11 is a second diagram illustrating an exemplary numerical control processing result according to the first embodiment of the present invention.
Figure 12:
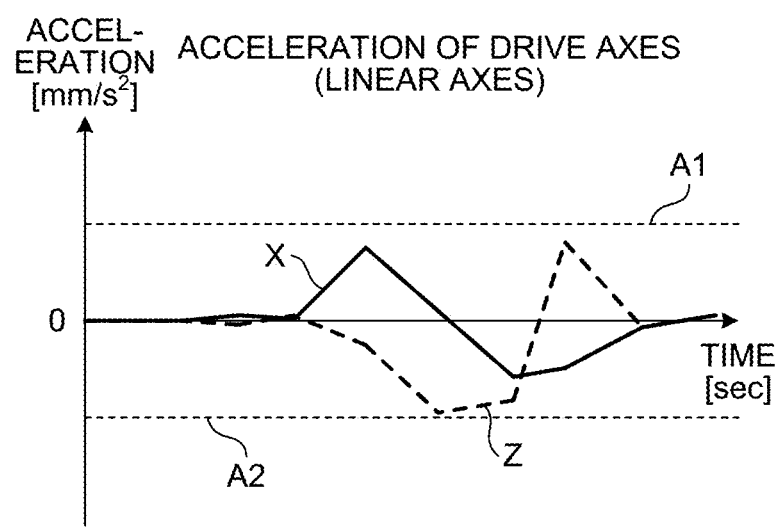
FIG. 12 is a third diagram illustrating an exemplary numerical control processing result according to the first embodiment of the present invention.
Figure 13:
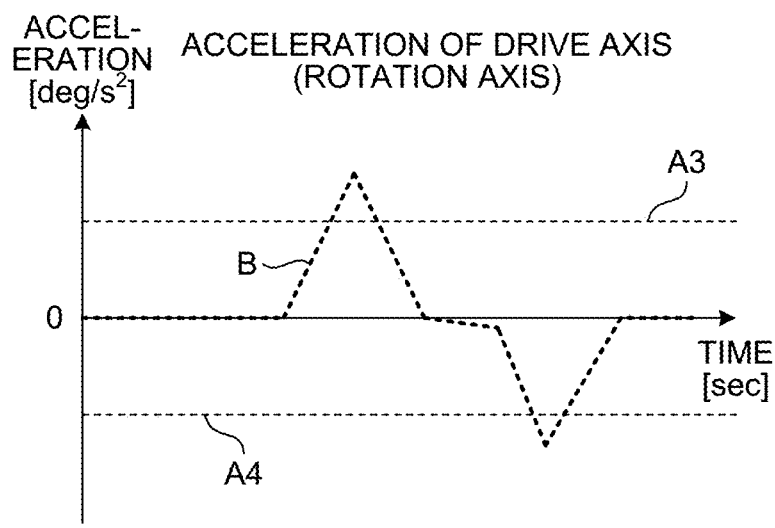
FIG. 13 is a fourth diagram illustrating an exemplary numerical control processing result according to the first embodiment of the present invention.

FIG. 10 is a first diagram illustrating an exemplary numerical control processing result according to the first embodiment. FIG. 11 is a second diagram illustrating an exemplary numerical control processing result according to the first embodiment. FIG. 12 is a third diagram illustrating an exemplary numerical control processing result according to the first embodiment. FIG. 13 is a fourth diagram illustrating an exemplary numerical control processing result according to the first embodiment. Specifically, FIGS. 10 to 13 illustrate examples of the numerical control processing results calculated in step S1 by the numerical control simulation unit 106 based on the movement command TP1 and the numerical control machine tool information of the numerical control machine tool M1.

FIG. 10 shows the position of the linear axes X and Z of the numerical control machine tool M1 at each time as a calculated numerical control processing result. In FIG. 10, the vertical axis represents the position (mm), and the horizontal axis represents time (sec). FIG. 11 shows the position of the rotation axis B of the numerical control machine tool M1 at each time. In FIG. 11, the vertical axis represents the position (deg), and the horizontal axis represents time (sec). FIG. 12 shows the acceleration of the linear axes X and Z of the numerical control machine tool M1 at each time. In FIG. 12, the vertical axis represents the acceleration (mm/s$^2$), and the horizontal axis represents time (sec). FIG. 12 also shows an upper limit A1 on the acceleration of the linear axes and a lower limit A2 on the acceleration of the linear axes. FIG. 13 shows the acceleration of the rotation axis B of the numerical control machine tool M1 at each time. In FIG. 13, the vertical axis represents the acceleration, and the horizontal axis represents time. FIG. 13 also shows an upper limit A3 on the acceleration of the rotation axis and a lower limit A4 on the acceleration of the rotation axis.

According to the calculated numerical control processing results and the modification condition stored in the modification condition storage unit 102, the modification part detection unit 107 detects a modification part, i.e. a part of the movement command to be modified, the details of which are as follows. The modification condition storage unit 102 receives an external input of a modification condition for detecting a modification part based on the numerical control processing results. The modification condition for detection may be, for example, the allowable range of position, speed, acceleration, or acceleration change of each drive axis of the numerical control machine tool, or may be a value exceeding the range of position, speed, acceleration, or acceleration change of each drive axis of the numerical control machine tool. Alternatively, the modification condition for detection may be the allowable range calculated using some calculation formula. Alternatively, the modification condition for detection may be selected from a list of modification conditions prepared in advance.

An exemplary case where the allowable range of acceleration of each drive axis of the numerical control machine tool is given as a modification condition will be described with reference to FIGS. 12 and 13. FIG. 12 illustrates an examination of whether the acceleration of the linear axes X and Z of the numerical control machine tool M1 exceeds the upper limit A1 of the allowable range and the lower limit A2 of the allowable range. Similarly, FIG. 13 illustrates an examination of whether the acceleration of the rotation axis B of the numerical control machine tool M1 exceeds the upper limit of the allowable range and the lower limit of the allowable range.

Here, it is found as illustrated in FIG. 13 that the acceleration of the B axis exceeds the allowable range in some parts. The modification part detection unit 107 detects the parts where the acceleration of the B axis exceeds the allowable range as the modification parts to be modified in the movement command.

Figure 14:
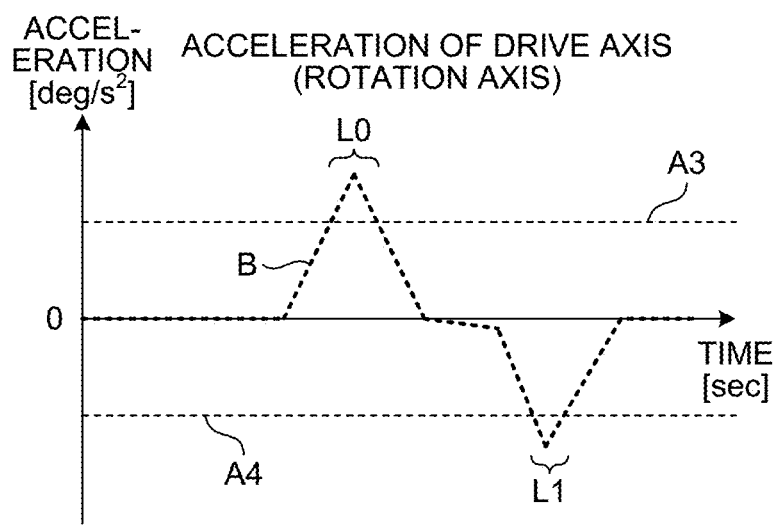
FIG. 14 is a first diagram illustrating the determination of modification sections according to the first embodiment of the present invention.
Figure 15:
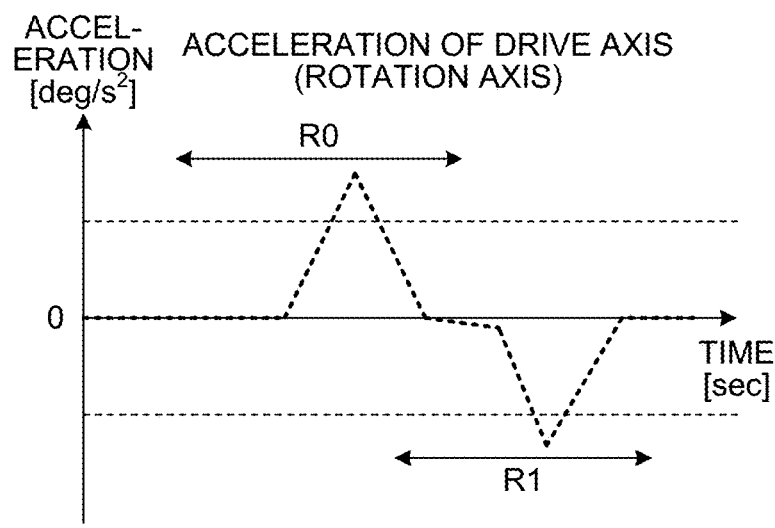
FIG. 15 is a second diagram illustrating the determination of modification sections according to the first embodiment of the present invention.
Figure 16:
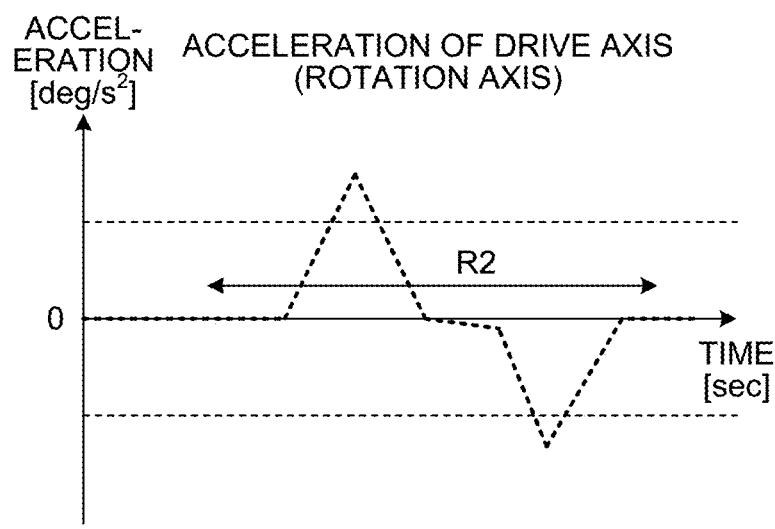
FIG. 16 is a third diagram illustrating the determination of modification sections according to the first embodiment of the present invention.

FIG. 14 is a first diagram illustrating the determination of modification sections according to the first embodiment of the present invention. FIG. 15 is a second diagram illustrating the determination of modification sections according to the first embodiment of the present invention. FIG. 16 is a third diagram illustrating the determination of modification sections according to the first embodiment of the present invention.

FIG. 14 shows that the two parts where the acceleration of the B axis exceeds the allowable range are detected as a modification part L0 and a modification part L1. As indicated in step S2 of FIG. 3, the modification section determination unit 109 determines a modification section in which the movement command is to be modified according to the detected modification parts. For example, the modification section determination unit 109 determines a modification section by designating a predetermined time range including the detected modification parts, designating a predetermined range of the number of command points including the detected modification parts, or designating the range of command points including the detected modification parts and indicating the machining of the same machining curved surface. In addition, if a plurality of modification sections are determined and two or more of the modification sections overlap each other, the modification sections may be combined into one modification section.

FIG. 15 shows that modification sections R0 and R1 are determined from the detected modification parts L0 and L1. FIG. 16 shows that the modification section R0 and the modification section R1 overlapping each other are combined into one modification section R2.

The operation in step S4 of FIG. 3, in which the cutting point calculation unit 108 identifies cutting points, will be described in detail. A tool end position is a relative position of the tool machining the workpiece with respect to the workpiece. A tool axis direction is a relative direction of the tool machining the workpiece with respect to the surface of the workpiece. Therefore, the tool located based on the tool end position and the tool axis direction is ideally in contact with the machining curved surface of the machining target shape. In this case, the point on the machining curved surface of the machining target shape at which the tool and the machining curved surface are in contact with each other is identified as a cutting point. However, the given tool end position and tool axis direction may have an error that can result in no contact between the tool and the machining curved surface of the machining target shape. In such a case, the cutting point can be identified with the following methods.

Figure 17:
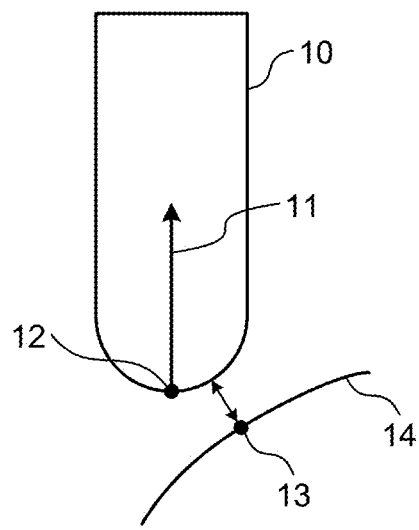
FIG. 17 is a first diagram illustrating the identification of a cutting point for a ball end mill tool according to the first embodiment of the present invention.

FIG. 17 is a first diagram illustrating the identification of a cutting point for a ball end mill tool according to the first embodiment of the present invention. FIG. 17 shows that a tool 10 located with its end at a tool end position 12 and its rotation axis in a tool axis direction 11 is separate from a machining curved surface 14. In this case, the cutting point calculation unit 108 identifies, as a cutting point 13, one point on the machining curved surface at which the distance between the tool 10 and the machining curved surface 14 is shortest.

Figure 18:
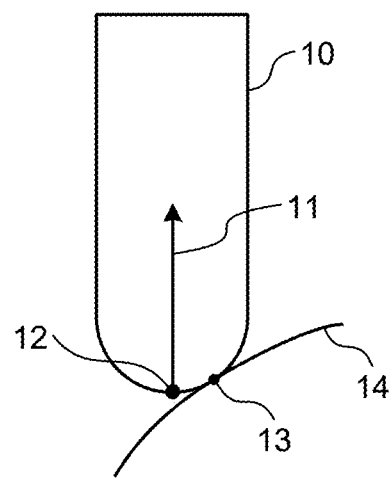
FIG. 18 is a second diagram illustrating the identification of a cutting point for a ball end mill tool according to the first embodiment of the present invention.

FIG. 18 is a second diagram illustrating the identification of a cutting point for a ball end mill tool according to the first embodiment of the present invention. FIG. 18 shows that the tool 10 located with its end at the tool end position 12 and its rotation axis in the tool axis direction 11 is in contact with the machining curved surface 14. In this case, the cutting point 13 is the contact point between the tool 10 and the machining curved surface 14.

Figure 19:
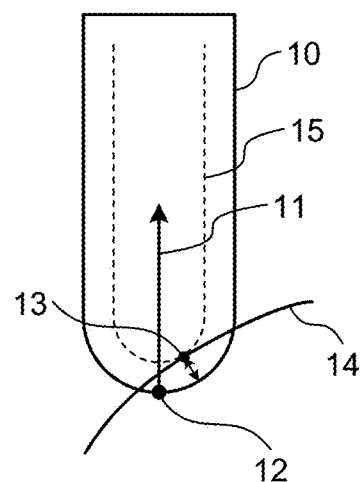
FIG. 19 is a third diagram illustrating the identification of a cutting point for a ball end mill tool according to the first embodiment of the present invention.

FIG. 19 is a third diagram illustrating the identification of a cutting point for a ball end mill tool according to the first embodiment of the present invention. FIG. 19 shows that the tool 10 located with its end at the tool end position 12 and its rotation axis in the tool axis direction 11 interferes with the machining curved surface 14. In this case, the tool 10 is offset inward until the tool 10 comes into contact with the machining curved surface 14 as an offset tool 15, and one point at which the offset tool 15 is in contact with the machining curved surface 14 is identified as the cutting point 13.

Figure 20:
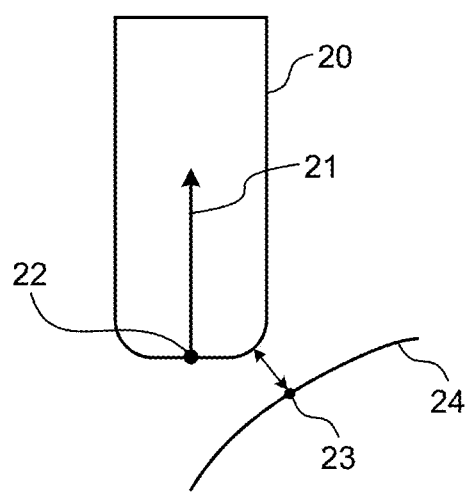
FIG. 20 is a first diagram illustrating the identification of a cutting point for a radius end mill tool according to the first embodiment of the present invention.

FIG. 20 is a first diagram illustrating the identification of a cutting point for a radius end mill tool according to the first embodiment of the present invention. FIG. 20 shows that a tool 20 located with its end at a tool end position 22 and its rotation axis in a tool axis direction 21 is separate from a machining curved surface 24. In this case, the cutting point calculation unit 108 identifies, as a cutting point 23, one point on the machining curved surface at which the distance between the tool 20 and the machining curved surface 24 is shortest.

Figure 21:
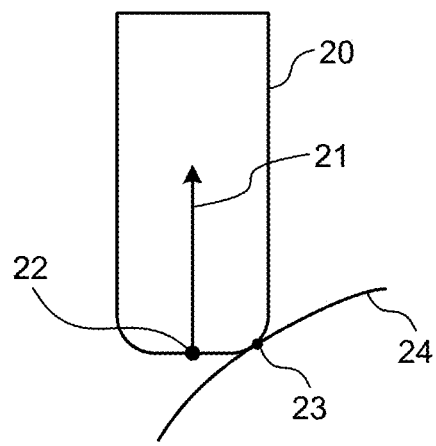
FIG. 21 is a second diagram illustrating the identification of a cutting point for a radius end mill tool according to the first embodiment of the present invention.
Figure 22:
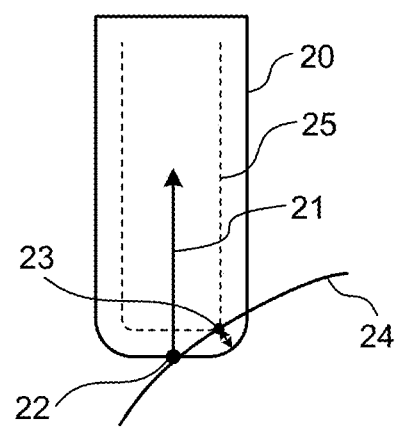
FIG. 22 is a third diagram illustrating the identification of a cutting point for a radius end mill tool according to the first embodiment of the present invention.

FIG. 21 is a second diagram illustrating the identification of a cutting point for a radius end mill tool according to the first embodiment of the present invention. FIG. 22 is a third diagram illustrating the identification of a cutting point for a radius end mill tool according to the first embodiment of the present invention. FIGS. 21 and 22 are similar to FIGS. 18 and 19 except that the cutting point calculation unit 108 identifies the cutting point 23 for the radius end mill.

Figure 23:
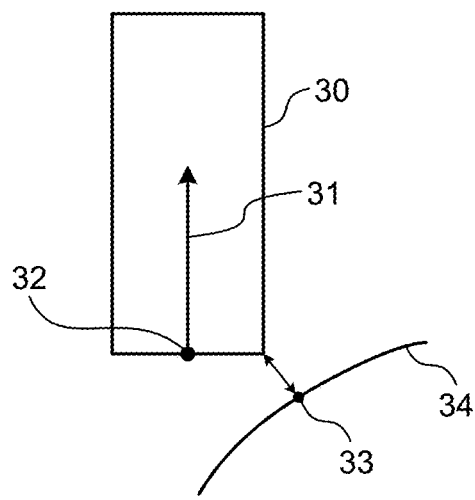
FIG. 23 is a first diagram illustrating the identification of a cutting point for a flat end mill tool according to the first embodiment of the present invention.

FIG. 23 is a first diagram illustrating the identification of a cutting point for a flat end mill tool according to the first embodiment of the present invention. FIG. 23 shows that a tool 30 located with its end at a tool end position 32 and its rotation axis in a tool axis direction 31 is separate from a machining curved surface 34. In this case, the cutting point calculation unit 108 identifies, as a cutting point 33, one point on the machining curved surface at which the distance between the tool 30 and the machining curved surface 34 is shortest.

Figure 24:
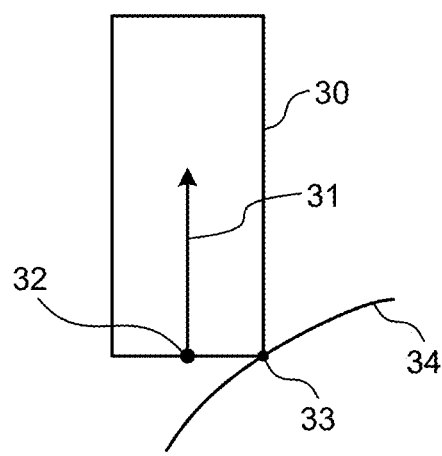
FIG. 24 is a second diagram illustrating the identification of a cutting point for a flat end mill tool according to the first embodiment of the present invention.
Figure 25:
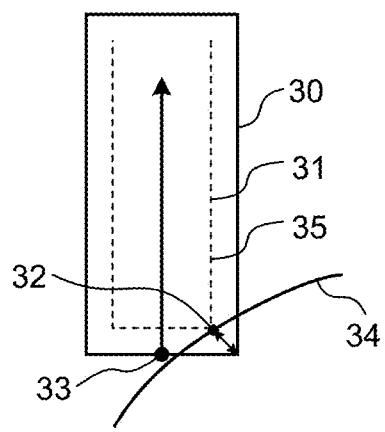
FIG. 25 is a third diagram illustrating the identification of a cutting point for a flat end mill tool according to the first embodiment of the present invention.

FIG. 24 is a second diagram illustrating the identification of a cutting point for a flat end mill tool according to the first embodiment of the present invention. FIG. 25 is a third diagram illustrating the identification of a cutting point for a flat end mill tool according to the first embodiment of the present invention. FIGS. 24 and 25 are similar to FIGS. 18 and 19 except that the cutting point calculation unit 108 identifies the cutting point 33 for the flat end mill.

Figure 26:
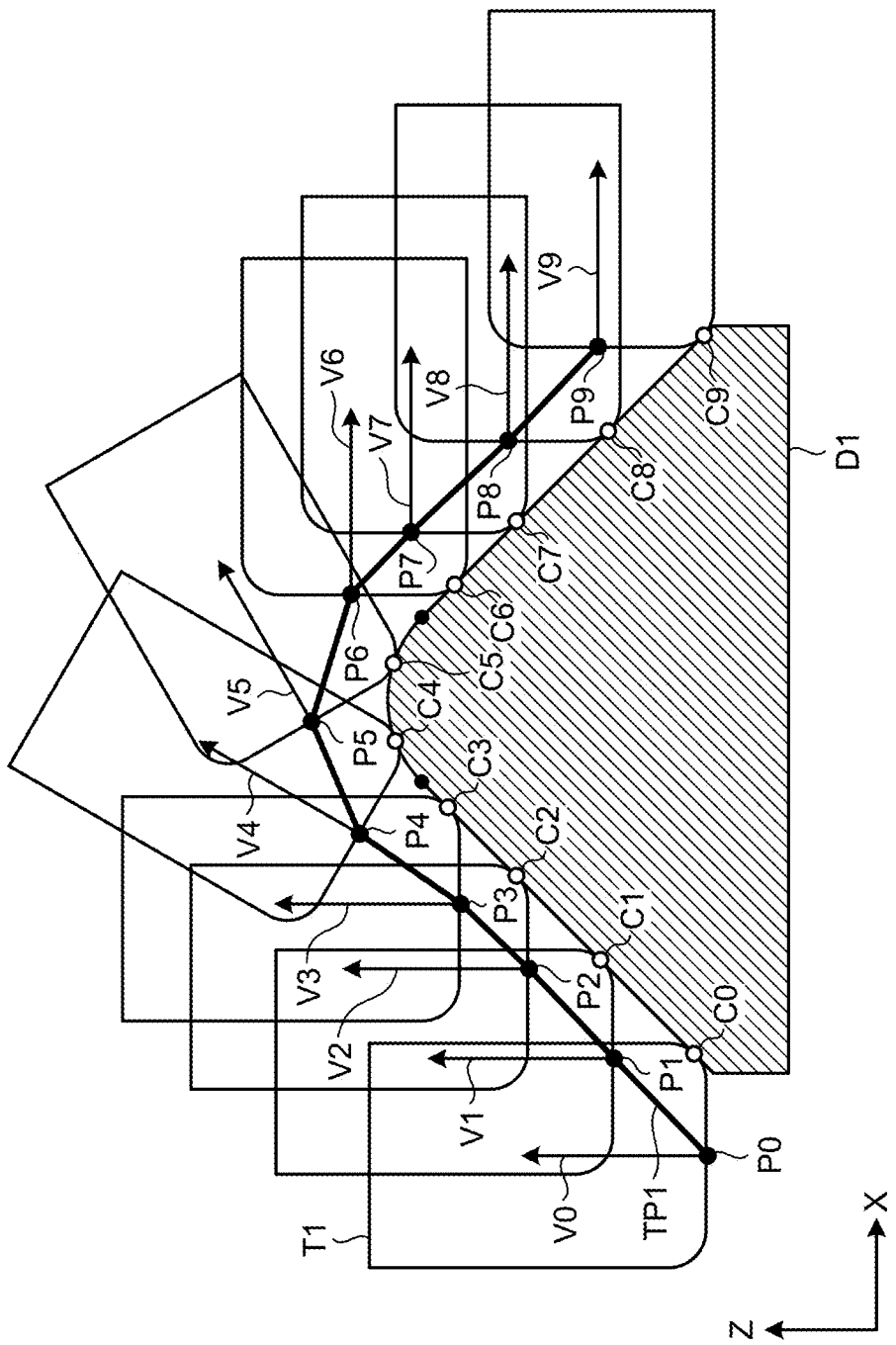
FIG. 26 is a diagram illustrating the identification of cutting points on the machining curved surfaces of the machining target shape, where the tool is arranged based on the movement command in the machining program, according to the first embodiment of the present invention.

FIG. 26 is a diagram illustrating the identification of cutting points on the machining curved surfaces of the machining target shape, where the tool is arranged based on the movement command in the machining program, according to the first embodiment of the present invention. FIG. 26 shows the identification of cutting points on the machining curved surfaces of the machining target shape D1 in the case where the tool T1 is arranged based on the tool end positions P0 to P9 and the tool axis directions V0 to V9 specified by the movement command TP1. For the tool end positions P0 to P9, cutting points C0 to C9 are respectively identified as points at which the tool T1 is in contact with the machining curved surfaces.

Hereinafter, the process in step S5 of FIG. 3, in which the machining program modification unit 111 modifies the movement command based on the movement command in the machining program, the determined modification section, and the calculated cutting points, will be described in detail.

First, the machining program modification unit 111 modifies the rotation axis commands in the modification section. For example, the modification is performed using a method of replacing position commands such that the movement path of the tool in the modification section has a smooth curve and rearranging rotation axis commands on the curve, or a method of smoothing rotation axis commands using a moving average. In the case of using the method of rearranging rotation axis commands on the curve, the machining program modification unit 111 can replace the position commands with position commands having a derivative that does not exceed the allowable range of speed, acceleration, and acceleration change of the rotation axis given as the above-mentioned modification condition, so that the modified rotation axis commands satisfy the modification condition.

Alternatively, the machining program modification unit 111 may modify rotation axis commands such that the difference between the angle formed between the tool axis direction specified by each original rotation axis command and the normal vector of the machining curved surface at the corresponding cutting point and the angle formed between the tool axis direction specified by the modified rotation axis command and the normal vector of the machining curved surface at the cutting point is less than or equal to a predetermined value. Still alternatively, the machining program modification unit 111 may extract first information that is movement commands having cutting points on the same machining curved surface among the movement commands of all modification sections, and modify rotation axis commands such that the rotation axis commands of the movement commands close to each other in the traveling direction and the adjacent direction of the tool become uniformly smooth. A possible modification method therefor is to extract, from among the movement commands having cutting points on the same machining curved surface, the movement command present at the farthest end and the movement command present at the opposite end, and set gradually varying tool axis directions between the tool axis directions specified by the identified movement commands.

Another possible modification method is to calculate, from the movement commands having cutting points on the same machining curved surface, the normal vector of the machining curved surface at each cutting point, and assign the movement commands tool axis directions that vary according to the amount of change between normal vectors close to each other in the traveling direction and the adjacent direction of the tool.

Figure 27:
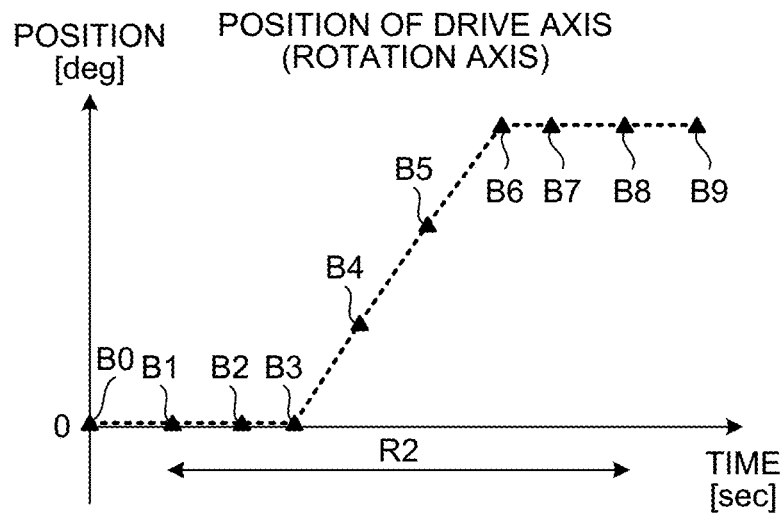
FIG. 27 is a first diagram illustrating the identification of modified rotation axis commands according to the first embodiment of the present invention.

FIG. 27 is a first diagram illustrating the identification of modified rotation axis commands according to the first embodiment of the present invention. In FIG. 27, the vertical axis represents the position, and the horizontal axis represents time. FIG. 27 shows how the machining program modification unit 111 extracts rotation axis commands B1 to B8 included in the determined modification section R2 from among rotation axis commands B0 to B9 of the movement command TP1 in the machining program. The rotation axis commands B0 to B9 are the rotation axis commands used to define the tool axis directions V0 to V9 of the movement command TP1, respectively.

Figure 28:
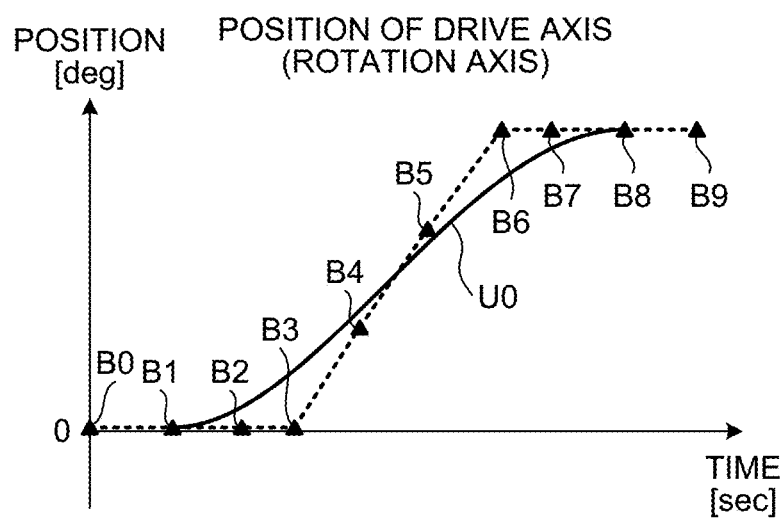
FIG. 28 is a second diagram illustrating the identification of modified rotation axis commands according to the first embodiment of the present invention.

FIG. 28 is a second diagram illustrating the identification of modified rotation axis commands according to the first embodiment of the present invention. In FIG. 28, the vertical axis represents the position, and the horizontal axis represents time. FIG. 28 shows how the machining program modification unit 111 generates a smooth curve U0 that replaces the extracted rotation axis commands B1 to B8. In this case, the curve U0 has end points at B1 and B8.

Figure 29:
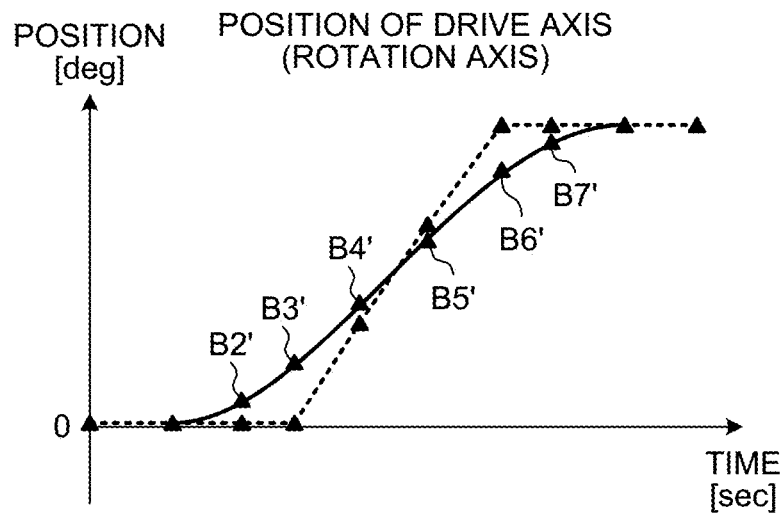
FIG. 29 is a third diagram illustrating the identification of modified rotation axis commands according to the first embodiment of the present invention.

FIG. 29 is a third diagram illustrating the identification of modified rotation axis commands according to the first embodiment of the present invention. In FIG. 29, the vertical axis represents the position, and the horizontal axis represents time. FIG. 29 shows how the machining program modification unit 111 identifies, on the generated curve U0, new rotation axis commands B2' to B7' that replace the original rotation axis commands B2 to B7. In this case, the machining program modification unit 111 identifies points on the curve U0 corresponding to the times of the original rotation axis commands B2 to B7 as the new rotation axis commands B2' to B7'.

Figure 30:
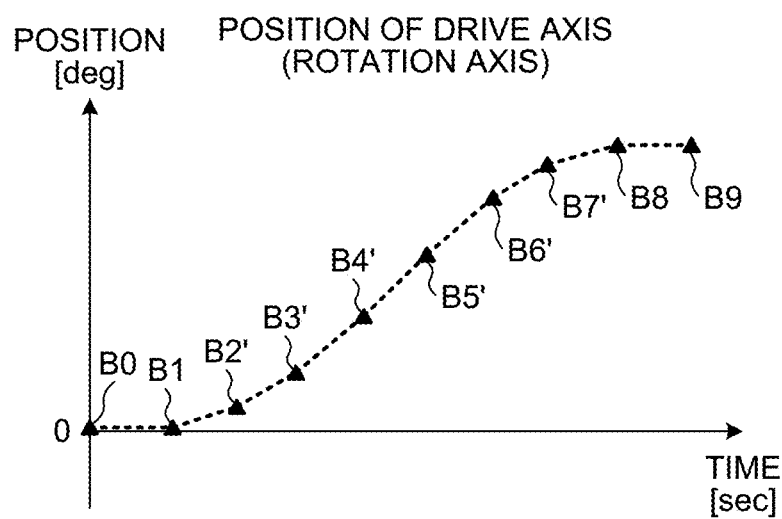
FIG. 30 is a fourth diagram illustrating the identification of modified rotation axis commands according to the first embodiment of the present invention.

FIG. 30 is a fourth diagram illustrating the identification of modified rotation axis commands according to the first embodiment of the present invention. In FIG. 30, the vertical axis represents the position, and the horizontal axis represents time. FIG. 30 shows the final rotation axis commands B0, B1, B2' to B7', B8, and B9 modified for the B axis. Subsequently, tool end positions are modified based on the modified rotation axis commands. In this case, the machining program modification unit 111 modifies the tool end positions such that the positions of the cutting points calculated in advance do not change. The new tool axis directions determined by the modified rotation axis commands and the cutting points uniquely define the tool end positions.

Figure 31:
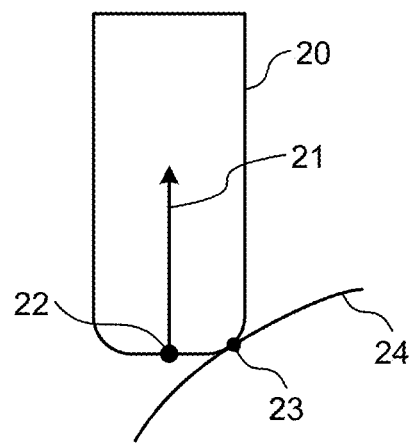
FIG. 31 is a first diagram illustrating the modification of a rotation axis command according to the first embodiment of the present invention.

FIG. 31 is a first diagram illustrating the modification of a rotation axis command according to the first embodiment of the present invention. FIG. 31 depicts the cutting point of the tool located based on the original tool end point position and the tool axis direction defined by the rotation axis command.

Figure 32:
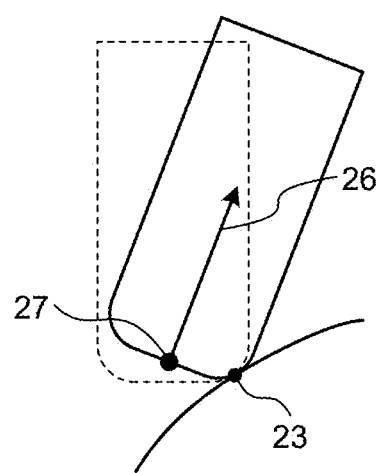
FIG. 32 is a second diagram illustrating the modification of a rotation axis command according to the first embodiment of the present invention.

FIG. 32 is a second diagram illustrating the modification of a rotation axis command according to the first embodiment of the present invention. FIG. 32 shows how the modified tool end position is identified such that the cutting point does not change when the tool is oriented in the modified tool axis direction defined by the modified rotation axis command. Here, in order not to change the cutting point, the tool located at the original tool end point position in the original tool axis direction is rotated about the cutting point such that the rotation axis is aligned with a modified tool axis direction 26, and the resultant position is designated as a modified tool end position 27.

Figure 33:
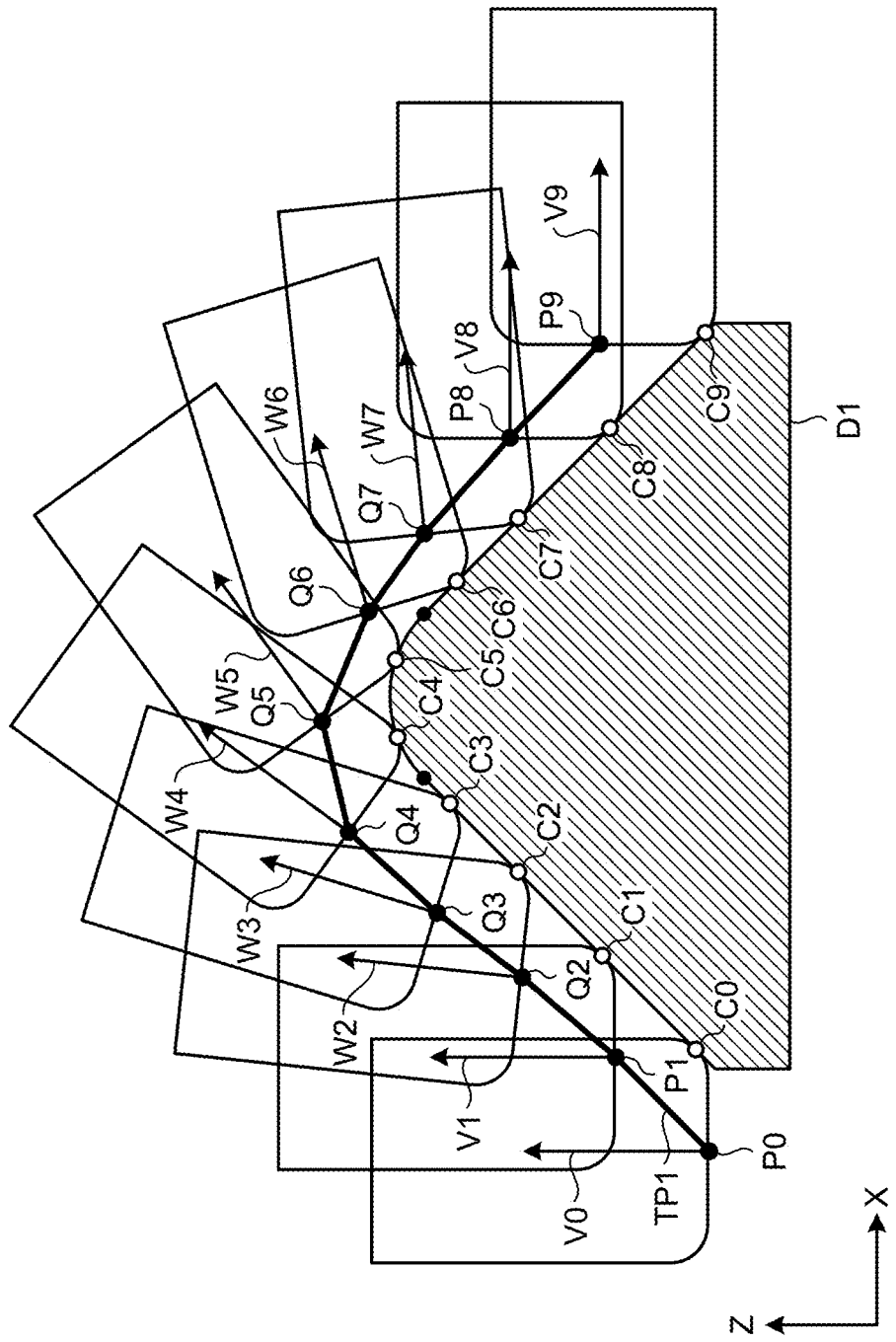
FIG. 33 is a diagram illustrating the identification of modified tool end positions based on the modified tool axis directions and the cutting points according to the first embodiment of the present invention.

FIG. 33 is a diagram illustrating the identification of modified tool end positions based on the modified tool axis directions and the cutting points according to the first embodiment of the present invention. FIG. 33 shows how the machining program modification unit 111 identifies the modified tool end positions based on the cutting points and the modified rotation axis commands. First, modified tool axis directions W2 to W7 defined by the modified rotation axis commands B2' to B7' are identified. In this case, because the rotation axis commands B0, B1, B8, and B9 do not change, the tool axis directions V0, V1, V8, and V9 do not change, either. Next, the machining program modification unit 111 rotates the tool arranged at the positions of the tool end positions P2 to P7 about the cutting points C2 to C7 respectively such that the rotation axis of the tool is aligned with the modified tool axis directions W2 to W7.

The post-rotation tool end positions can be identified as modified tool end positions Q2 to Q7. When identifying the post-rotation tool end positions, the interference check unit 110 determines whether there is an interference between the tool, the workpiece, and the components of the numerical control machine tool based on the numerical control machine tool information stored in the machine tool information storage unit 101, the tool end positions, and the tool axis directions. Consequently, for example, if an interference is predicted to occur based on the modified tool end positions and tool axis directions, the machining program modification unit 111 can avoid using the modified tool end positions and tool axis directions. Alternatively, if an interference is predicted to occur based on the modified tool end positions and tool axis directions, the machining program modification unit 111 can identify in advance a modifiable region that is a region of rotation axis commands in which no interference occurs when rotation axis commands are modified, and modify rotation axis commands within the modifiable region. In addition, if it is not possible to modify rotation axis commands without the occurrence of interference, the interference check unit 110 may notify the operator of this fact.

Finally, the machining program modification unit 111 modifies the movement command based on the modified tool end positions and rotation axis commands, and stores the modified machining program in the modified machining program storage unit 112. In this case, the machining program modification unit 111 may execute numerical control simulation based on the movement command in the modified machining program and check the numerical control processing results. In addition, the machining program modification unit 111 may notify the operator of the numerical control processing results.

Figure 34:
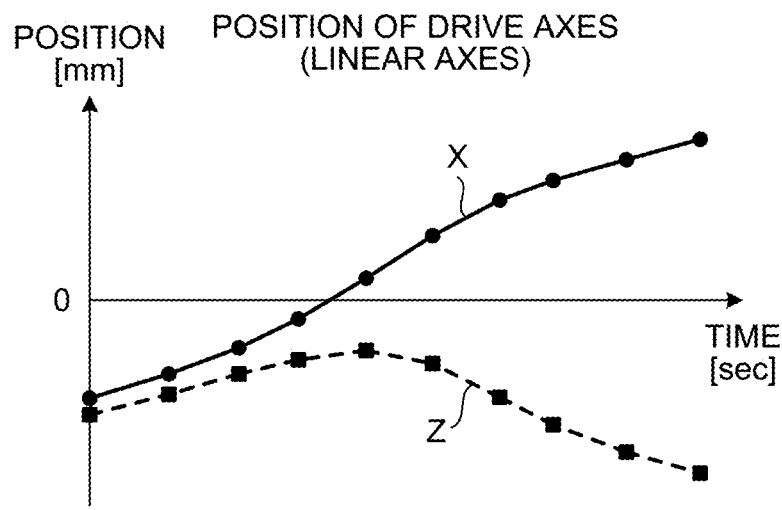
FIG. 34 is a first diagram illustrating an exemplary numerical control processing result from the modified machining program according to the first embodiment of the present invention.

FIG. 34 is a first diagram illustrating an exemplary numerical control processing result from the modified machining program according to the first embodiment of the present invention. FIG. 34 shows an exemplary numerical control processing result calculated based on the modified movement command TP1 and the numerical control machine tool information of the numerical control machine tool M1. FIG. 34 shows the position of the linear axes X and Z of the numerical control machine tool M1 at each time as a calculated numerical control processing result.

Figure 35:
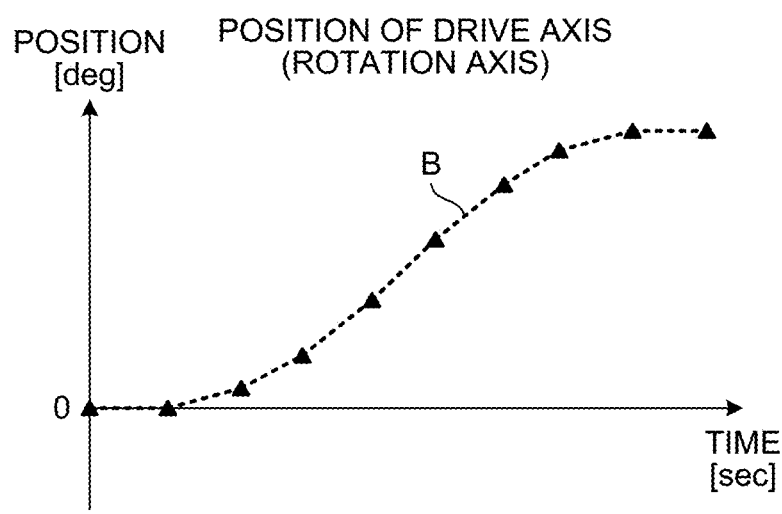
FIG. 35 is a second diagram illustrating an exemplary numerical control processing result from the modified machining program according to the first embodiment of the present invention.
Figure 36:
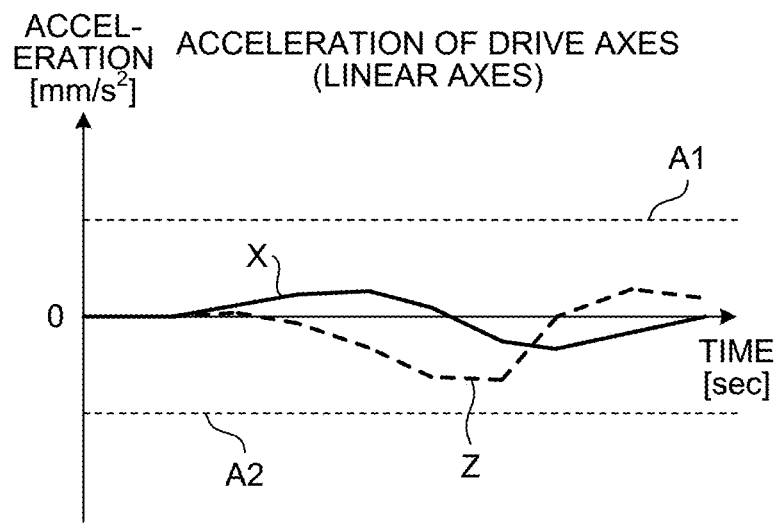
FIG. 36 is a third diagram illustrating an exemplary numerical control processing result from the modified machining program according to the first embodiment of the present invention.
Figure 37:
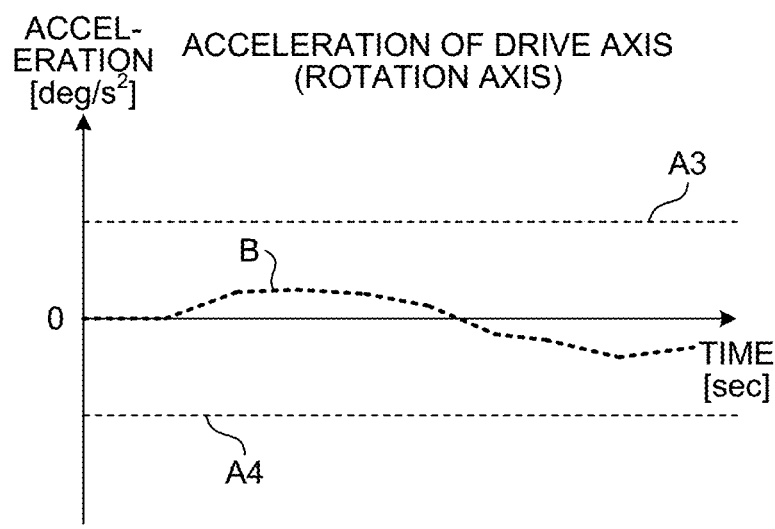
FIG. 37 is a fourth diagram illustrating an exemplary numerical control processing result from the modified machining program according to the first embodiment of the present invention.

FIG. 35 is a second diagram illustrating an exemplary numerical control processing result from the modified machining program according to the first embodiment of the present invention. FIG. 35 shows the position of the rotation axis B of the numerical control machine tool M1 at each time. FIG. 36 is a third diagram illustrating an exemplary numerical control processing result from the modified machining program according to the first embodiment of the present invention. FIG. 36 shows the acceleration of the linear axes X and Z of the numerical control machine tool M1 at each time. FIG. 37 is a fourth diagram illustrating an exemplary numerical control processing result from the modified machining program according to the first embodiment of the present invention. FIG. 37 shows the acceleration of the rotation axis B of the numerical control machine tool M1 at each time.

It is found from FIGS. 36 and 37 that the acceleration of each of the linear and rotation axes is within the allowable range. In the above-described manner, the machining program modification unit 111 can identify the modified tool end positions and rotation axis commands, modify the movement command in the machining program based on the modified tool end point positions and rotation axis commands, and create the modified machining program. The modified machining program stored in the modified machining program storage unit 112 is input to the numerical control device 113 for machining. The above is the operation of the machining program conversion device according to the first embodiment of the present invention.

As described above, the machining program conversion device 100 according to the first embodiment of the present invention modifies the movement command such that the cutting points do not change, and thus achieves the effect of being capable of modifying rotation axis commands while preventing excessive cutting and insufficient cutting even in machining programs specifying trajectories different from ball center trajectories of a ball end mill. In addition, the machining program conversion device 100 achieves the effect of improving work efficiency by determining a modification section in advance to shorten the time required for modification.

In addition, the machining program conversion device 100 according to the first embodiment of the present invention achieves the effect of improving machining quality by detecting and modifying a part where the acceleration or acceleration change exceeds an allowable range to prevent abrupt movement of the drive axes. In addition, the machining program conversion device 100 achieves the effect of improving machining quality by setting through modification rotation axis commands with which the allowable range of acceleration or the allowable range of acceleration change is not exceeded, to prevent abrupt movement of the rotation axis. In addition, the machining program conversion device 100 achieves the effect of improving work efficiency by preventing the occurrence of interference due to the modification of a movement command to enable a reduction in man-hours for checking the modified machining program.

In addition, the machining program conversion device 100 achieves the effect of improving machining quality by varying the rotation axis commands on the same machining surface uniformly and smoothly to obtain a smooth machining surface. In addition, the machining program conversion device 100 achieves the effect of improving work efficiency because the tool axis vector with respect to the machining surface does not greatly change through modification so that the property of the machining surface does not greatly change through machining, enabling a reduction in man-hours for checking.

Second Embodiment

Figure 38:
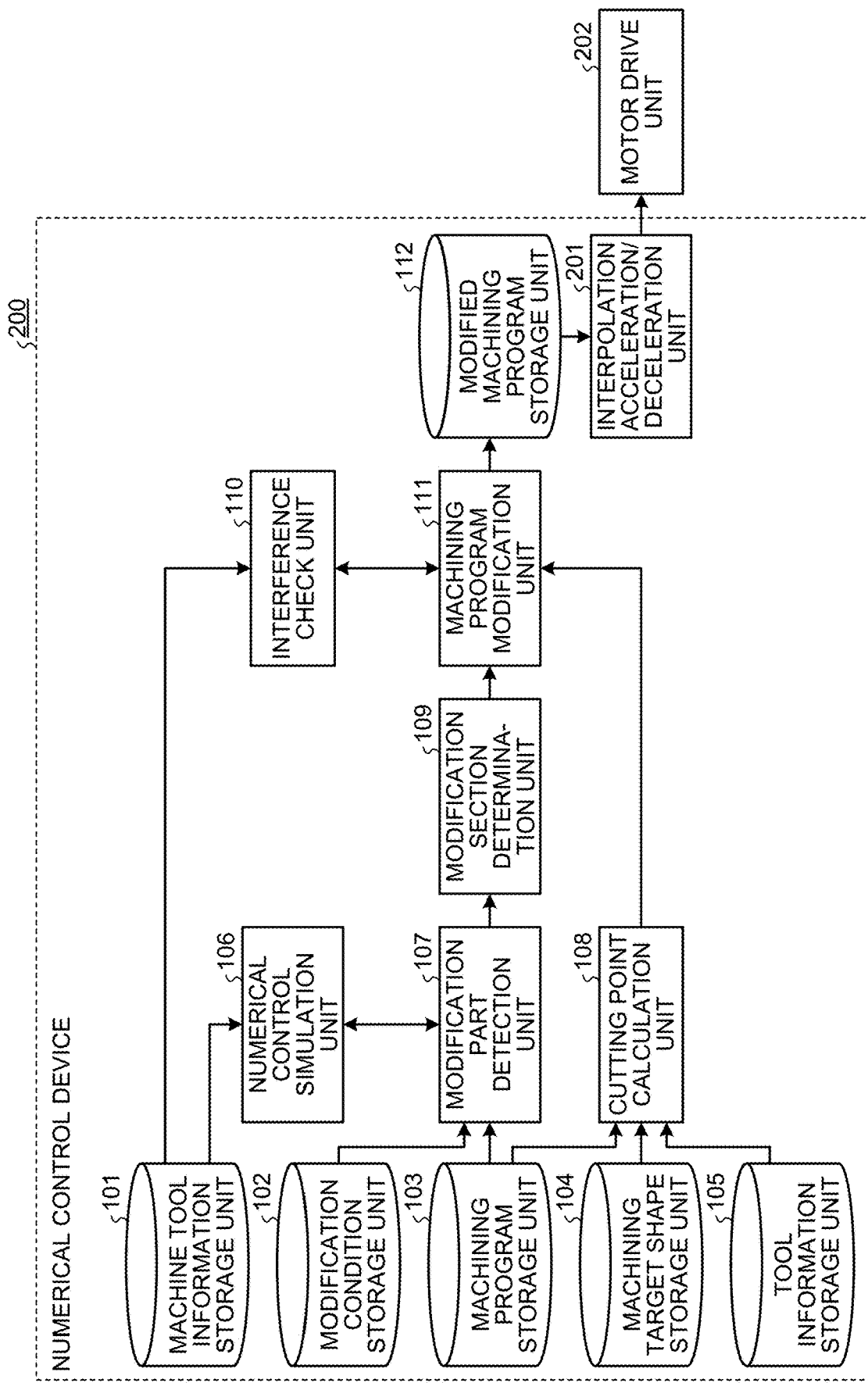
FIG. 38 is a diagram illustrating a configuration of a numerical control device according to a second embodiment of the present invention.

Hereinafter, a numerical control device according to the second embodiment of the present invention will be described in detail with reference to the drawings. FIG. 38 is a diagram illustrating a configuration of a numerical control device 200 according to the second embodiment. Note that components having the same functions as those in the first embodiment are denoted by the same reference signs as those in the first embodiment, and redundant explanations are omitted. The numerical control device 200 includes an interpolation acceleration/deceleration unit 201 in addition to the functional units provided in the machining program conversion device 100.

Based on the modified machining program stored in the modified machining program storage unit 112, the interpolation acceleration/deceleration unit 201 generates interpolation points by identifying the interpolation cycle of each drive axis, that is, the amount of movement per unit time, according to the movement command and performing interpolation, and outputs the interpolation points to a motor drive unit 202. The motor drive unit 202 drives the motor such that each axis of the numerical control machine tool moves to desired positions based on the interpolation points. The other operations are similar to those of the machining program conversion device 100 described in the first embodiment of the present invention, and thus explanations thereof are omitted. The above is an example of the operation of the numerical control device 200 according to the second embodiment of the present invention. The numerical control device 200 according to the second embodiment of the present invention includes the components of the machining program conversion device 100; therefore, the numerical control device 200 can perform numerical control based on the modified movement command. Thus, no temporary external output of the modified machining program is required, which can improve work efficiency.

Third Embodiment

Figure 39:
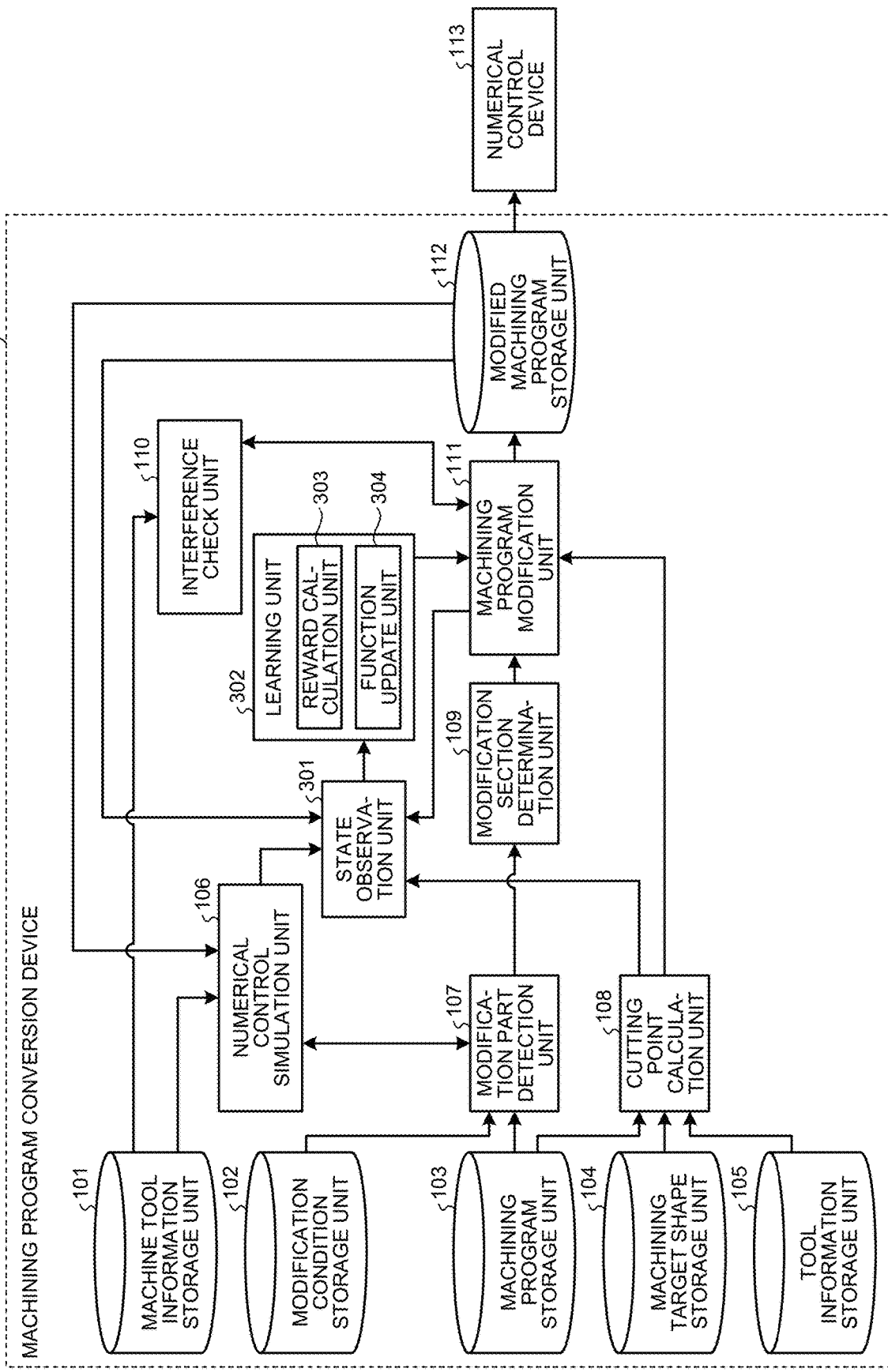
FIG. 39 is a diagram illustrating a configuration of a machining program conversion device according to a third embodiment of the present invention.

Hereinafter, a machining program conversion device 300 according to the third embodiment of the present invention will be described in detail with reference to the drawings. FIG. 39 is a diagram illustrating a configuration of the machining program conversion device 300 according to the third embodiment of the present invention. The machining program conversion device 300 includes a state observation unit 301 and a learning unit 302 in addition to the components of the machining program conversion device 100.

The state observation unit 301 observes, as state variables, observation results such as the movement commands in the machining program and the cutting points calculated by the cutting point calculation unit 108.

The learning unit 302 learns a method of modifying movement commands in the machining program modification unit 111 based on a data set created based on the state variables observed by the state observation unit 301.

The learning unit 302 may use any learning algorithm. In the embodiment of the present invention, an example in which reinforcement learning is applied will be described. In reinforcement learning, an agent (subject of an action) in an environment observes the current state and determines the action to take. The agent gains a reward from the environment by selecting an action, and learns how to maximize the reward through a series of actions. Q-learning or TD-learning is known as a representative method of reinforcement learning. For example, in the case of Q-learning, a general update expression for the action value function Q (s, a) is represented by Formula (1). The action value function Q (s, a) is also called an action value table.

[Formula 1]

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In Formula (1), $s_t$ represents the environment at time t, and $a_t$ represents the action at time t. The action $a_t$ changes the environment to $s_{t+1}$. In addition, $r_{t+1}$ represents the reward that can be gained due to the change of the environment. In addition, $\gamma$ represents a discount rate. In addition, $\alpha$ represents a learning coefficient. Note that $\gamma$ is in the range of $0<\gamma\leq 1$, and $\alpha$ is in the range of $0<\alpha\leq 1$. The action $a_t$ is a method of modifying movement commands in the machining program modification unit 111.

The update expression represented by Formula (1) increases the action value function Q when the action value of the best action a at time t+1 is greater than the action value function Q of the action a executed at time t, and otherwise reduces the action value function Q. In other words, the action value function Q (s, a) is updated such that the action value function Q of the action a at time t is brought closer to the best action value at time t+1. As a result, the best action value in a certain environment sequentially propagates to the action values in the previous environments.

The learning unit 302 includes a reward calculation unit 303 and a function update unit 304. The reward calculation unit 303 calculates the reward r based on the relationship between numerical control processing results and modification conditions. For example, the reward calculation unit 303 increases the reward r if a numerical control processing result is within the allowable range of the modification condition. For example, the reward calculation unit 303 gives a reward of "1". On the other hand, if a numerical control processing result exceeds the allowable range of the modification condition, the reward calculation unit 303 reduces the reward r. For example, the reward calculation unit 303 gives a reward of "−1". The relationship between numerical control processing results and modification conditions is extracted using to a known method.

The function update unit 304 updates a function for determining a method of modifying movement commands in the machining program modification unit 111 according to the reward calculated by the reward calculation unit 303. For example, in the case of Q-learning, the action value function Q ($s_t$, $a_t$) represented by Formula (1) is used as a function for determining a method of modifying movement commands in the machining program modification unit 111. A method of modifying movement commands in the machining program modification unit 111 may be selected from among a plurality of methods prepared in advance.

The machining program modification unit 111 modifies a movement command in the machining program based on the movement command in the machining program, the determined modification section, the calculated cutting points, and the determined method of modifying movement commands. The other operations are similar to those of the machining program conversion device in the first embodiment of the present invention, and thus explanations thereof are omitted.

Note that although the present embodiment has described the case where reinforcement learning is applied to the learning algorithm used by the learning unit 302, the present invention is not limited thereto. As the learning algorithm, supervised learning, unsupervised learning, semi-supervised learning, or the like can be applied instead of reinforcement learning. The above-described learning algorithm can also be deep learning, which learns feature extraction directly. Alternatively, other known methods such as neural networks, genetic programming, functional logic programming, and support vector machines can be used to execute machine learning.

Note that the machine learning device, which is used to learn a method of modifying movement commands in the machining program modification unit 111, may be a device that is separate from the machining program conversion device 300 and is connected to the machining program conversion device via a network. Alternatively, the machine learning device may be incorporated in the machining program conversion device 300. Still alternatively, the machine learning device may exist on a cloud server.

In addition, the learning unit 302 may learn a method of modifying movement commands in the machining program modification unit 111 based on data sets created for a plurality of machining program conversion devices. Note that the learning unit 302 may learn a method of modifying movement commands in the machining program modification unit 111 by acquiring data sets from a plurality of machining program conversion devices used at the same site, or by using data sets collected from a plurality of machine tools operating independently at different sites.

Further, it is possible to add a new machining program conversion device to a list of machining program conversion devices from which data sets are collected, or to remove some machining program conversion device from the list. Further, the machine learning device that has learned a method of modifying movement commands in the machining program modification unit 111 from some machining program conversion device may be attached to a different machining program conversion device so as to relearn a method of modifying movement commands in the machining program modification unit 111 from the different machining program conversion device.

The above is the operation of the machining program conversion device 300 according to the third embodiment of the present invention. The machining program conversion device according to the third embodiment of the present invention can modify the machining program while learning a method of modifying movement commands in the machining program, and thus achieves the effect of improving machining quality by modifying movement commands using the optimum method of modifying movement commands to smooth the motion of the drive axes.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST

100, 300 machining program conversion device; 101 machine tool information storage unit; 102 modification condition storage unit; 103 machining program storage unit; 104 machining target shape storage unit; 105 tool information storage unit; 106 numerical control simulation unit; 107 modification part detection unit; 108 cutting point calculation unit; 109 modification section determination unit; 110 interference check unit; 111 machining program modification unit; 112 modified machining program storage unit; 113 numerical control device; 200 numerical control device; 201 interpolation acceleration/deceleration unit; 202 motor drive unit; 301 state observation unit; 302 learning unit; 303 reward calculation unit; 304 function update unit; 500 control circuit; 500*a* processor; 500*b* memory.

The invention claimed is:

1. A machining program conversion device comprising:
   a machining program storage circuitry to store a machining program describing a movement command that is a command for moving a tool according to a predetermined path;
   a machining target shape storage circuitry to store a machining target shape that is a finished shape of a workpiece to be machined through movement of the tool;
   a tool information storage circuitry to store tool information about a shape of the tool;
   a numerical control simulation circuitry to generate a numerical control processing result by simulating, based on the machining program, numerical control processing of a numerical control machine tool that is controlled by the machining program;
   a modification part detection circuitry to detect a modification part in the machining program based on a modification condition and the numerical control processing result, the modification condition being a condition for determining whether there is a modification part in the machining program;
   a modification section determination circuitry to designate a plurality of consecutive blocks including the modification part as a modification section;
   a cutting point calculation circuitry to identify, based on the machining program, the machining target shape, and the tool information, a cutting point of the tool with respect to the machining target shape in the movement command in the machining program; and
   a machining program modification circuitry to modify, based on the machining program, the modification section, and the cutting point, the movement command related to the modification section such that the cutting point does not change.

2. The machining program conversion device according to claim 1, comprising
   a modification condition storage circuitry to store the modification condition, wherein
   the modification condition storage circuitry stores an allowable range of acceleration and/or an allowable range of acceleration change of each drive axis of the numerical control machine tool, and
   the modification part detection circuitry detects, based on the modification condition, a part where each drive axis of the numerical control machine tool exceeds the allowable range of acceleration or the allowable range of acceleration change.

3. The machining program conversion device according to claim 2, wherein the machining program modification circuitry replaces rotation axis commands in the modification section with a curve having a derivative that does not exceed the allowable range of acceleration or the allowable range of acceleration change, and generates new rotation axis commands on the curve for modification.

4. The machining program conversion device according to claim 1, comprising
   an interference check circuitry to detect an interference between the tool, the workpiece, and each component of the numerical control machine tool, wherein the machining program modification circuitry identifies, in the modification section, a modifiable region that is a region of rotation axis commands in which the interference does not occur, and modifies the rotation axis commands in the modification section such that the rotation axis commands in the modification section pass through the modifiable region.

5. The machining program conversion device according to claim 1, wherein
the cutting point calculation circuitry calculates first information for identifying on which machining curved surface of the machining target shape a plurality of the cutting points are present, and
the machining program modification circuitry extracts the cutting points identified using the first information as being present on a same machining curved surface, and modifies rotation axis commands in a plurality of the movement commands corresponding to the cutting points extracted such that modified rotation axis commands smoothly vary on the machining curved surface.

6. The machining program conversion device according to claim 1, wherein
the cutting point calculation circuitry calculates, from a machining curved surface of the machining target shape on which a plurality of the cutting points are present, a normal vector of the machining curved surface at each of the cutting points, and
the machining program modification circuitry identifies, with respect to a plurality of the movement commands, an angle formed between a tool axis vector specified by a rotation axis command before modification and the normal vector, and modifies the rotation axis command such that an amount of change in an angle formed after modification of the rotation axis command is less than or equal to a predetermined value.

7. The machining program conversion device according to claim 1, comprising:
a state observation circuitry to observe, as state variables, the movement command in the machining program, the cutting point, the numerical control processing result, and a method of modifying the movement command; and
a learning circuitry to learn a method of modifying the movement command in the machining program according to a data set created based on the state variables, wherein
the machining program modification circuitry modifies the machining program according to the method of modifying the movement command in the machining program learned.

8. A numerical control device comprising:
a machining program storage circuitry to store a machining program describing a movement command that is a command for moving a tool according to a predetermined path;
a machining target shape storage circuitry to store a machining target shape that is a finished shape of a workpiece to be machined through movement of the tool;
a tool information storage circuitry to store tool information about a shape of the tool;
a numerical control simulation circuitry to generate a numerical control processing result by simulating, based on the machining program, numerical control processing of a numerical control machine tool that is controlled by the machining program;
a modification part detection circuitry to detect a modification part in the machining program based on a modification condition and the numerical control processing result, the modification condition being a condition for determining whether there is a modification part in the machining program;
a modification section determination circuitry to designate a plurality of consecutive blocks including the modification part as a modification section;
a cutting point calculation circuitry to identify, based on the machining program, the machining target shape, and the tool information, a cutting point of the tool with respect to the machining target shape in the movement command in the machining program; and
a machining program modification circuitry to modify, based on the machining program, the modification section, and the cutting point, the movement command related to the modification section such that the cutting point does not change.

9. A machining program conversion method comprising:
storing, by a machining program storage circuitry, a machining program describing a movement command that is a command for moving a tool according to a predetermined path;
storing, by a machining target shape storage circuitry, a machining target shape that is a finished shape of a workpiece to be machined through movement of the tool;
storing, by a tool information storage circuitry, tool information about a shape of the tool;
generating, by a numerical control simulation circuitry, a numerical control processing result by simulating, based on the machining program, numerical control processing of a numerical control machine tool that is controlled by the machining program;
detecting, by a modification part detection circuitry, a modification part in the machining program based on a modification condition and the numerical control processing result, the modification condition being a condition for determining whether there is a modification part in the machining program;
designating, by a modification section determination circuitry, a plurality of consecutive blocks including the modification part as a modification section;
identifying, by a cutting point calculation circuitry, based on the machining program, the machining target shape, and the tool information, a cutting point of the tool with respect to the machining target shape in the movement command in the machining program; and
modifying, by a machining program modification circuitry, based on the machining program, the modification section, and the cutting point, the movement command related to the modification section such that the cutting point does not change.

* * * * *